(12) United States Patent
Zhu et al.

(10) Patent No.: US 12,393,644 B2
(45) Date of Patent: Aug. 19, 2025

(54) HIGH-ORDER CORRELATION PRESERVED INCOMPLETE MULTI-VIEW SUBSPACE CLUSTERING METHOD AND SYSTEM

(71) Applicant: ZHEJIANG NORMAL UNIVERSITY, Jinhua (CN)

(72) Inventors: Xinzhong Zhu, Jinhua (CN); Huiying Xu, Jinhua (CN); Chang Tang, Jinhua (CN); Jianmin Zhao, Jinhua (CN)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 43 days.

(21) Appl. No.: 18/288,040

(22) PCT Filed: Apr. 24, 2022

(86) PCT No.: PCT/CN2022/088792
§ 371 (c)(1),
(2) Date: Nov. 27, 2023

(87) PCT Pub. No.: WO2022/228348
PCT Pub. Date: Nov. 3, 2022

(65) Prior Publication Data
US 2024/0248960 A1 Jul. 25, 2024

(30) Foreign Application Priority Data
Apr. 25, 2021 (CN) .......................... 202110446987.X

(51) Int. Cl.
*G06F 16/00* (2019.01)
*G06F 17/16* (2006.01)
*G06F 18/2321* (2023.01)

(52) U.S. Cl.
CPC .......... *G06F 18/2321* (2023.01); *G06F 17/16* (2013.01)

(58) Field of Classification Search
CPC ...... G06F 18/2321; G06F 17/16; G06F 18/23; G06V 10/44
See application file for complete search history.

(56) References Cited

U.S. PATENT DOCUMENTS

2019/0325343 A1\* 10/2019 Feng ....................... G06F 17/16

FOREIGN PATENT DOCUMENTS

| CN | 108734187 A | | 11/2018 |
| CN | 109685155 A | \* | 4/2019 |

(Continued)

OTHER PUBLICATIONS

Purkait et al., "Clustering with Hypergraphs: The Case for Large Hyperedges",Sep. 2017, IEEE,vol. 39, No. 9,pp. 1697-1711 (Year: 2017).\*

(Continued)

*Primary Examiner* — Alexander Khong
(74) *Attorney, Agent, or Firm* — Bayramoglu Law Offices LLC

(57) ABSTRACT

A high-order correlation preserved incomplete multi-view subspace clustering method and system. The method comprises: S11, inputting an original data matrix, and converting original data into an observed part and an incomplete part; S12, obtaining a plurality of affinity matrices according to self-representation characteristics of the original data; S13, mining a high-order correlation between the plurality of affinity matrices by tensor factorization; S14, learning a unified affinity matrix from the plurality of affinity matrices, so as to obtain a global affinity matrix; S15, constructing a hypergraph on the basis of the global affinity matrix, and constraining an incomplete part of incomplete multi-view data by using a hypergraph-induced Laplacian matrix; S16, integrating the global affinity matrix, the tensor factorization and the hypergraph-induced Laplacian matrix constraint into (Continued)

a unified learning framework; S17, solving the obtained objective function by an alternating iterative optimization strategy; and S18, applying spectral clustering to the global affinity matrix.

8 Claims, 22 Drawing Sheets

(56) References Cited

FOREIGN PATENT DOCUMENTS

| | | |
|---|---|---|
| CN | 110263815 A | 9/2019 |
| CN | 113239983 A | 8/2021 |

OTHER PUBLICATIONS

Xiaolan Liu, et al., Missing multi-view clustering based on StarGAN and subspace learning, Journal of South China University of Technology (Natural Science Edition), Nov. 2020, pp. 87-98, vol. 48, No. 11.

* cited by examiner

| Datasets | Methods | F-score | Precision | Recall | NMI | AR | ACC | Purity |
|---|---|---|---|---|---|---|---|---|
| 3sources | BSV | 0.2117 | 0.1809 | 0.2654 | 0.0302 | 0.0032 | 0.2261 | 0.2779 |
| | MIC | 0.3072 | 0.2213 | 0.5020 | 0.3408 | 0.0788 | 0.4159 | 0.4471 |
| | MKKM-IK | 0.7012 | 0.7198 | 0.6836 | 0.6859 | 0.6383 | 0.8197 | 0.8197 |
| | MKKM-IK-MKC | 0.5978 | 0.6105 | 0.5857 | 0.6153 | 0.5125 | 0.7528 | 0.7528 |
| | UEAF | 0.7185 | 0.7257 | 0.9039 | 0.6808 | 0.6580 | 0.8351 | 0.8351 |
| | FLSD | 0.7991 | 0.7985 | 0.9788 | 0.7432 | 0.7352 | 0.8870 | 0.8870 |
| | EE-R-IMVC | 0.5863 | 0.6053 | 0.5685 | 0.5727 | 0.4998 | 0.7185 | 0.7185 |
| | Ours | 0.8399 | 0.8452 | 0.8347 | 0.7931 | 0.8054 | 0.9135 | 0.9135 |
| bbc | BSV | 0.3116 | 0.2931 | 0.3326 | 0.1282 | 0.1225 | 0.4066 | 0.4199 |
| | MIC | 0.3686 | 0.2568 | 0.6530 | 0.3024 | 0.1096 | 0.4443 | 0.4456 |
| | MKKM-IK | 0.8649 | 0.8608 | 0.8690 | 0.7916 | 0.8304 | 0.9258 | 0.9258 |
| | MKKM-IK-MKC | 0.8456 | 0.8407 | 0.8505 | 0.7647 | 0.8060 | 0.9160 | 0.9160 |
| | UEAF | 0.8599 | 0.8528 | 0.9811 | 0.7881 | 0.8239 | 0.9240 | 0.9240 |
| | FLSD | 0.8201 | 0.8117 | 0.9960 | 0.7414 | 0.7737 | 0.8984 | 0.8984 |
| | EE-R-IMVC | 0.7968 | 0.7922 | 0.8014 | 0.7081 | 0.7447 | 0.8876 | 0.8876 |
| | Ours | 0.8929 | 0.8946 | 0.9935 | 0.8306 | 0.8658 | 0.9425 | 0.9425 |
| bbcsport | BSV | 0.3171 | 0.3061 | 0.3303 | 0.2456 | 0.0978 | 0.3976 | 0.4413 |
| | MIC | 0.5454 | 0.4625 | 0.6647 | 0.4796 | 0.3720 | 0.5482 | 0.5984 |
| | MKKM-IK | 0.7387 | 0.7757 | 0.7050 | 0.6777 | 0.6639 | 0.8521 | 0.8521 |
| | MKKM-IK-MKC | 0.7188 | 0.7567 | 0.6846 | 0.6576 | 0.6387 | 0.8377 | 0.8377 |
| | UEAF | 0.7677 | 0.7731 | 0.9596 | 0.7040 | 0.6976 | 0.8752 | 0.8752 |
| | FLSD | 0.8551 | 0.8490 | 0.9938 | 0.8008 | 0.8106 | 0.9267 | 0.9267 |
| | EE-R-IMVC | 0.6894 | 0.7243 | 0.6577 | 0.5916 | 0.6006 | 0.8233 | 0.8233 |
| | Ours | 0.9202 | 0.9189 | 0.9809 | 0.8761 | 0.8958 | 0.9607 | 0.9607 |

FIG. 3

(a) MSRCV1

(b) ORL (c) Yale (d) 100leaves (e) COIL20

(f) handwritten (a) MSRCV1

(b) ORL (c) Yale (d) 100leaves (e) COIL20

(f) handwritten (a) MSRCV1

(b) ORL (c) Yale (d) 100leaves (e) COIL20

(f) handwritten (a) MSRCV1

(b) ORL (c) Yale (d) 100leaves (e) COIL20

(f) handwritten

| Datasets | HR | TF | F-score | Precision | Recall | NMI | AR | ACC | Purity |
|---|---|---|---|---|---|---|---|---|---|
| 3sources | | | 0.2347 | 0.2027 | 0.2788 | 0.0875 | 0.0351 | 0.2954 | 0.3381 |
| | | ✓ | 0.7468 | 0.7422 | 0.7515 | 0.6921 | 0.6913 | 0.8534 | 0.8534 |
| | ✓ | | 0.5940 | 0.5298 | 0.7150 | 0.5243 | 0.4923 | 0.6587 | 0.6995 |
| | ✓ | ✓ | 0.8399 | 0.8452 | 0.8347 | 0.7931 | 0.8054 | 0.9135 | 0.9135 |
| bbc | | | 0.3368 | 0.2028 | 0.9935 | 0.0075 | 0.0004 | 0.2315 | 0.2333 |
| | | ✓ | 0.8812 | 0.8806 | 0.9935 | 0.8185 | 0.8510 | 0.9348 | 0.9348 |
| | ✓ | | 0.3368 | 0.2042 | 0.9935 | 0.0108 | 0.0033 | 0.2358 | 0.2376 |
| | ✓ | ✓ | 0.8929 | 0.8946 | 0.9935 | 0.8306 | 0.8658 | 0.9425 | 0.9425 |
| bbcsport | | | 0.3777 | 0.2339 | 0.9801 | 0.0216 | 0.0011 | 0.3650 | 0.3677 |
| | | ✓ | 0.7961 | 0.8079 | 0.9801 | 0.7200 | 0.7333 | 0.8792 | 0.8792 |
| | ✓ | | 0.3786 | 0.2352 | 0.9809 | 0.0242 | 0.0044 | 0.3674 | 0.3677 |
| | ✓ | ✓ | 0.9202 | 0.9189 | 0.9809 | 0.8761 | 0.8958 | 0.9607 | 0.9607 |

FIG. 8

(a) 3sources (b) bbcsport (c) bbc (a) 3sources (b) bbcsport (c) bbc (a) 3sources (b) bbcsport (c) bbc (a) 3sources (b) bbcsport (c) bbc

HIGH-ORDER CORRELATION PRESERVED INCOMPLETE MULTI-VIEW SUBSPACE CLUSTERING METHOD AND SYSTEM

CROSS REFERENCES TO RELATED APPLICATIONS

This application is the national stage entry of International Application No. PCT/CN2022/088792, filed on Apr. 24, 2022, which is based on and claims foreign priority to Chinese Patent Application No. 202110446987.X filed on Apr. 25, 2021, the entire contents of which are incorporated herein by reference.

TECHNICAL FIELD

The present application relates to the technical field of signal processing and data analysis, and in particular to a high-order correlation preserved incomplete multi-view subspace clustering method and system.

BACKGROUND

With the advancement of information acquisition technologies, multimedia data can often be acquired from various sources in real-world application scenarios. For example, in multimedia image retrieval tasks, color, texture, and edges can be used to describe images, while in video scenario analysis tasks, cameras from different angles can provide additional information for analyzing a same scenario. This type of data is referred to as multi-view data, giving rise to a series of multi-view learning algorithms, such as multi-view clustering and the like. The acquisition of semantic information from data is an important research topic in multimedia data mining. Multi-view clustering analyzes the multi-view features of data in an unsupervised manner to capture the intrinsic cluster information of the data, and it has gained increasing attention in recent years.

In many real-world applications, there may be some incomplete data samples in some views for some reasons in multi-view data. For example, when we deal with a cross-language document clustering task, not all documents are generally translated into different languages. In disease diagnosis, each disease test mode can be regarded as a view, but some people may not carry out all tests due to some uncontrollable factors. Mining complementary information from incomplete multi-view data becomes more difficult due to view incompleteness. In addition, as different views may have different number of incomplete instances, they will contribute unbalanced information to a clustering task. Therefore, it is difficult to capture a clustering structure of incomplete multi-view data directly using a conventional multi-view clustering method. In order to effectively cluster the incomplete multi-view data, a large number of incomplete multi-view clustering algorithms have been proposed and have achieve good clustering effects in the last decade. However, the existing incomplete multi-view clustering algorithms only utilize a paired sample correlation and a paired view correlation to improve the clustering performance, and high-order correlations of samples and views are ignored. Under this strategy, information loss in incomplete multi-view data is inevitable, and therefore, the clustering performance of the previous methods is limited.

SUMMARY

Aiming at the defects in the prior art, the present application provides a high-order correlation preserved incomplete multi-view subspace clustering method and system.

In the present application, high-order correlations can be generally divided into the following two parts: 1) in one aspect, a high-order sample correlation is used for describing a global class cluster structure of incomplete multi-view data, and in another aspect, it is used for disclosing structure information of a similar class cluster; and 2) a high-order view correlation describes global semantic consistency between a plurality of views. There are two benefits to capturing a high-order correlation: 1) it can better jointly utilize information between different views to obtain an underlying intrinsic cluster structure of data; and 2) incomplete samples in each view can be recovered more effectively by using information that the samples belong to other data points on the same hyperedge, rather than just first-order connected sample information. Therefore, mining a high-order correlation of data is necessary and efficient for an incomplete multi-view clustering task. Based on this, the present application provides a high-order correlation preserved incomplete multi-view subspace clustering (HCP-IMSC) method and system, which effectively recover incomplete samples of different views of incomplete multi-view data and subspace structures of the data by using the high-order correlation of the data.

In order to achieve the above objective, the present application adopts the following technical solutions.

Provided is a high-order correlation preserved incomplete multi-view subspace clustering method, which comprises:

S1, inputting an original data matrix, and converting the inputted original data into an observed part and an incomplete part;

S2, obtaining a plurality of affinity matrices corresponding to incomplete multi-view data according to self-representation characteristics of the original data;

S3, mining a high-order correlation between the plurality of affinity matrices by means of tensor factorization;

S4, learning a unified affinity matrix from the plurality of affinity matrices, so as to obtain a global affinity matrix;

S5, constructing a hypergraph on the basis of the global affinity matrix, and constraining an incomplete part of the incomplete multi-view data by using a hypergraph-induced Laplacian matrix;

S6, integrating the global affinity matrix, the tensor factorization and the hypergraph-induced Laplacian matrix constraint into a unified learning framework, so as to obtain an objective function;

S7, solving the obtained objective function by means of an alternating iterative optimization strategy, so as to obtain a solution result; and S8, applying spectral clustering to the global affinity matrix according to the obtained solution result, so as to obtain a clustering result.

Furthermore, converting the inputted original data into the observed part and the incomplete part in S1 is represented as:

$$X^{(v)} = X_o^{(v)} P_o^{(v)} + X_u^{(v)} P_u^{(v)}$$

wherein, $X^{(v)} \in R^{d_v \times n}$ represents a feature matrix of a v-th view; n represents the number of samples; $d_v$ represents the number of features in the v-th view; $X_o^{(v)} \in R^{d_v \times n_v}$ represents a feature matrix observed in the v-th view; $n_v$ represents the number of samples observed in the v-th view; $X_u^{(v)} \in R^{d_v \times (n-n_v)}$ represents incomplete samples in the v-th view; $P_o^{(v)} \in R^{d_v \times (n-n_v)}$ and $P_u^{(v)} \in R^{(n-n_v) \times n}$ represent that two transformation matrices map observed samples and incomplete samples into a same matrix, and are represented as:

$$p_{oij}^{(v)} = \begin{cases} 1, & \text{if } x_{oi}^{(v)} \text{ corresponds to } x_j^{(v)} \\ 0, & \text{otherwise} \end{cases}$$

$$p_{uij}^{(v)} = \begin{cases} 1, & \text{if } x_{ui}^{(v)} \text{ corresponds to } x_j^{(v)} \\ 0, & \text{otherwise} \end{cases}$$

wherein, $P_o{}^{(v)}{}_{ij}$ represents an i-th row and a j-th column of a matrix $P_o{}^{(v)}$; $p_u{}^{(v)}{}_{ij}$ represents an i-th row and a j-th column of a matrix $P_u{}^{(v)}$; $x_o{}^{(v)}{}_i$ represents an i-th column of a matrix $x_o{}^{(v)}$; $x_j{}^{(v)}$ represents a j-th column of a matrix $x^{(v)}$; $x_u{}^{(v)}{}_i$ represents an i-th column of a matrix $x_u{}^{(v)}$.

Furthermore, obtaining the plurality of affinity matrices corresponding to the incomplete multi-view data in S2 is represented as:

$$\min_{X_u^{(v)}, Z^{(v)}} \sum_{v=1}^{V} \|X^{(v)} - X^{(v)}Z^{(v)}\|_F^2 + \beta \text{rank}_t(Z)$$

$$\text{s.t. diag}(Z^{(v)}) = 0, Z_{ij}^{(v)} \geq 0, Z^{(v)} = Z^{(v)T}, Z = \Phi(Z^{(1)}, Z^{(2)}, \ldots, Z^{(V)})$$

wherein, $\text{diag}(Z^{(v)})=0$, $Z_{ij}{}^{(v)} \geq 0$ and $Z^{(v)T}$ are constrained such that a matrix $Z^{(v)} \in R^{n \times n}$ represents an affinity matrix of a v-th view; $\beta$ represents a penalty parameter; $Z \in R^{n \times n \times V}$ represents a tensor; $\Phi()$ represents converting a matrix into a tensor; V represents the number of views; $Z_{ij}{}^{(v)}$ represents an i-th row and a j-th column of the matrix $Z^{(v)}$; $Z^{(v)T}$ represents transpose of the matrix $Z^{(v)}$; $\|\ \|_F^2$ represents a Frobenius norm.

Furthermore, mining the high-order correlation between the plurality of affinity matrices by means of the tensor factorization in S3 is represented as:

$$\min_{X_u^{(v)}, Z^{(v)}, U, V} \sum_{v=1}^{V} \|X^{(v)} - X^{(v)}Z^{(v)}\|_F^2 + \beta\|Z - U * V\|_F^2$$

$$\text{s.t. } Z = \Phi(Z^{(1)}, Z^{(2)}, \ldots, Z^{(V)}), \text{diag}(Z^{(v)}) = 0, Z_{ij}^{(v)} \geq 0, Z^{(v)} = Z^{(v)T}$$

wherein, $U \in R^{n \times \hat{c} \times V}$ and $V \in R^{\hat{c} \times n \times V}$ represent two tensors with smaller sizes, satisfying $\text{rank}_t(U) = \text{rank}_t(V) = \hat{c}$, and $\text{rank}_t$ represents a tensor tubal rank; $\hat{c}$ represents a positive integer.

Furthermore, learning the unified affinity matrix from the plurality of affinity matrices, so as to obtain the global affinity matrix in S4 is represented as:

$$\min_A \omega_v \|Z^{(v)} - A\|_F^2 \text{ s.t. } \omega_v = \frac{1}{2\|Z^{(v)} - A\|_F}$$

wherein, $\omega_v$ represents a weight of the v-th view; and A represents the global affinity matrix.

Furthermore, the hypergraph-induced Laplacian matrix constraint in S5 is represented as:

$$\min_{X_u^{(v)}} Tr(X^{(v)} L_h X^{(v)T})$$

wherein, $L_h$ represents a hypergraph Laplacian matrix constructed on the basis of the global affinity matrix.

Furthermore, obtaining the objective function in S6 is represented as:

$$\min_{X_u^{(v)}, A, Z^{(v)}, U, V} \sum_{v=1}^{V} (\|X^{(v)} - X^{(v)}Z^{(v)}\|_F^2 +$$

$$\omega_v \|Z^{(v)} - A\|_F^2 + \alpha Tr(X^{(v)} L_h X^{(v)T})) + \beta \|Z - U * V\|_F^2$$

$$\text{s.t. } Z = \Phi(Z^{(1)}, Z^{(2)}, \ldots, Z^{(V)}), \text{diag}(Z^{(v)}) =$$

$$0, Z_{ij}^{(v)} \geq 0, Z^{(v)} = Z^{(v)T}, \omega_v = \frac{1}{2\|Z^{(v)} - A\|_F}$$

wherein, $\alpha$ represents a penalty parameter.

Furthermore, S7 specifically comprises:

S71, when variables A, $\{X_u^{(v)}\}_{v=1}^V$, U and V are fixed, the objective function being represented as:

$$\min_{Z^{(v)}} \|X^{(v)} - X^{(v)}Z^{(v)}\|_F^2 + \|Z^{(v)} - B^{(v)}\|_F^2$$

$$\text{s.t. diag}(Z^{(v)}) = 0, Z_{ij}^{(v)} \geq 0, Z^{(v)} = Z^{(v)T}$$

wherein, $B^{(v)}$ represents a v-th forward slice of a tensor B; the tensor B is obtained by $B = U * V$;

calculating a derivative of the objective function and setting the derivative to be 0, a solution of a variable $Z^{(v)}$ being:

$$Z^{(v)} = (I + Q^{(v)})^{-1}(Q^{(v)} + B^{(v)})$$

wherein, $Q^{(v)}$ represents an intermediate matrix, and is obtained by calculating $Q^{(v)} = X^{(v)T} X^{(v)}$;

optimizing the following formula, represented as:

$$\min_{Z^{(v)}} \|Z^{(v)} - \hat{Z}^{(v)}\|_F^2$$

$$\text{s.t. } Z_{ij}^{(v)} \geq 0, Z^{(v)} = Z^{(v)T}$$

wherein, $\hat{Z}^{(v)}$ represents an intermediate matrix, and is obtained by calculating $\hat{Z}^{(v)} = \hat{Z}^{(v)} - \text{diag}(\text{diag}(Z^{(v)}))$; and obtaining an optimal solution of the objective function, represented as:

$$Z^{(v)} = [(\hat{Z}^{(v)} + \hat{Z}^{(v)T})/2]_+$$

wherein, $\hat{Z}^{(v)T}$ represents transpose of the matrix $Z^{(v)}$;

S72, when variables $\{Z^{(v)}\}_{v=1}^V$, $\{X_u^{(v)}\}_{v=1}^V$, U and V are fixed, the objective function being represented as:

$$\min_A \sum_{v=1}^{V} \omega_v \|Z^{(v)} - A\|_F^2$$

calculating a derivative of the objective function and setting the derivative to be 0, a solution of the variable A being:

$$A = \frac{\sum_{v=1}^{V} \omega_v Z^{(v)}}{\sum_{v=1}^{V} \omega_v}$$

S73, when variables $\{Z^{(v)}\}_{v=1}^{V}$, A, U and V are fixed, substituting the variables into a formula $X^{(v)} = X_o^{(v)} P_o^{(v)} + X_u^{(v)} P_u^{(v)}$, the objective function being represented as:

$$\min_{X_u^{(v)}} \alpha Tr\left((X_o^{(v)} P_o^{(v)} + X_u^{(v)} P_u^{(v)}) L_h (X_o^{(v)} P_o^{(v)} + X_u^{(v)} P_u^{(v)})^T\right) + \\ \left\|(X_o^{(v)} P_o^{(v)} + X_u^{(v)} P_u^{(v)})(Z^{(v)} - I_n)\right\|_F^2$$

calculating a derivative of the objective function and setting the derivative to be 0, a solution of a variable $X_u^{(v)}$ being:

$$X_u^{(v)} = \left(X_o^{(v)} P_o^{(v)} M^{(v)} P_u^{(v)T}\right)\left(P_u^{(v)} M^{(v)} P_u^{(v)T}\right)^{-1}$$

wherein, $M^{(v)}$ represents an intermediate matrix, and is obtained by calculating $M^{(v)} = (Z^{(v)} - I)(Z^{(v)T} - I) + \alpha L_h$; I represents an identity matrix;

S74, when variables $\{Z^{(v)}\}_{v=1}^{V}$, A, $\{X_u^{(v)}\}_{v=1}^{V}$, and V are fixed, the objective function being represented as:

$$\min_U \|Z - U * V\|_F^2$$

making $\overline{Z}$, $\overline{U}$ and $\overline{V}$ represent results of a fast Fourier transform of the tensors Z, U and V along a third dimension, respectively, and substituting the results into a formula $$U * V = \sum_{v=1}^{V} \overline{U}^{(v)} \overline{V}^{(v)},$$

the objective function being represented as:

$$\min_{\overline{U}^{(v)}} \left\|\overline{Z}^{(v)} - \overline{U}^{(v)} \overline{V}^{(v)}\right\|_F^2$$

calculating a derivative of the objective function and setting the derivative to be 0, a solution of a variable $\overline{U}^{(v)}$ being:

$$\overline{U}^{(v)} = \overline{Z}^{(v)} \overline{V}^{(v)*} \left(\overline{V}^{(v)} \overline{V}^{(v)*}\right)^{-1}$$

wherein, $\overline{U}^{(v)}$ represents a v-th slice of the tensor $\overline{U}$; $\overline{Z}^{(v)}$ represents a v-th slice of the tensor $\overline{Z}$; $\overline{V}^{(v)}$ represents a v-th slice of the tensor $\overline{V}$; $\overline{V}^{(v)*}$ represents conjugate transpose of a matrix $\overline{V}^{(v)}$; and S75, when variables $\{Z^{(v)}\}_{v=1}^{V}$, A, $\{X_u^{(v)}\}_{v=1}^{V}$, and U are fixed, the objective function being represented as:

$$\min_{\overline{V}^{(v)}} \left\|\overline{Z}^{(v)} - \overline{U}^{(v)} \overline{V}^{(v)}\right\|_F^2$$

calculating a derivative of the objective function and setting the derivative to be 0, a solution of a variable $\overline{V}^{(v)}$ being:

$$\overline{V}^{(v)} = \left(\overline{U}^{(v)*} \overline{U}^{(v)}\right)^{-1} \overline{U}^{(v)*} \overline{Z}^{(v)}.$$

Furthermore, obtaining the optimal solution of the objective function in S71 specifically comprises: obtaining an optimal solution of the objective function in an unconstrained state, and mapping the obtained optimal solution in the unconstrained state into a space spanned by constrained items, so as to obtain a final solution of the objective function.

Correspondingly, further provided is a high-order correlation preserved incomplete multi-view subspace clustering system, which comprises:

an input module, configured to input an original data matrix and convert the inputted original data into an observed part and an incomplete part;

an acquiring module, configured to obtain a plurality of affinity matrices corresponding to incomplete multi-view data according to self-representation characteristics of the original data;

a mining module, configured to mine a high-order correlation between the plurality of affinity matrices by means of tensor factorization;

a unifying module, configured to learn a unified affinity matrix from the plurality of affinity matrices, so as to obtain a global affinity matrix;

a constraining module, configured to construct a hypergraph on the basis of the global affinity matrix, and constrain an incomplete part of the incomplete multi-view data by using a hypergraph-induced Laplacian matrix;

an integrating module, configured to integrate the global affinity matrix, the tensor factorization and the hypergraph-induced Laplacian matrix constraint into a unified learning framework, so as to obtain an objective function;

a solving module, configured to solve the obtained objective function by means of an alternating iterative optimization strategy, so as to obtain a solution result; and a clustering module, configured to apply spectral clustering to the global affinity matrix according to the obtained solution result, so as to obtain a clustering result.

Compared with the prior art, the present application provides a high-order correlation preserved incomplete multi-view subspace clustering method and system, which preserve high-order correlations between views and between samples by using tensor factorization and hypergraph-induced Laplacian regularization, thereby thoroughly mining complementary information between the views, and achieving aims of better recovering incomplete samples and improving clustering effects.

BRIEF DESCRIPTION OF THE DRAWINGS

FIG. 3 is clustering results of different algorithms on three naturally incomplete multi-view datasets according to Embodiment 2;

FIG. 8 is a schematic diagram of ablation experiment results of an HCPIMSC algorithm on three naturally incomplete multi-view datasets according to Embodiment 2;

DETAILED DESCRIPTION OF THE EMBODIMENTS

The embodiments of the present application are illustrated below through specific examples, and other advantages and effects of the present application can be easily understood by those skilled in the art based on the contents disclosed herein. The present application can also be implemented or applied through other different specific embodiments. Various modifications or changes to the details described in the specification can be made based on different perspectives and applications without departing from the spirit of the present application. It should be noted that, unless conflicting, the embodiments and features of the embodiments below may be combined with each other.

Aiming at the existing defects, the present application provides a high-order correlation preserved incomplete multi-view subspace clustering method and system.

Embodiment 1

Figure 1:
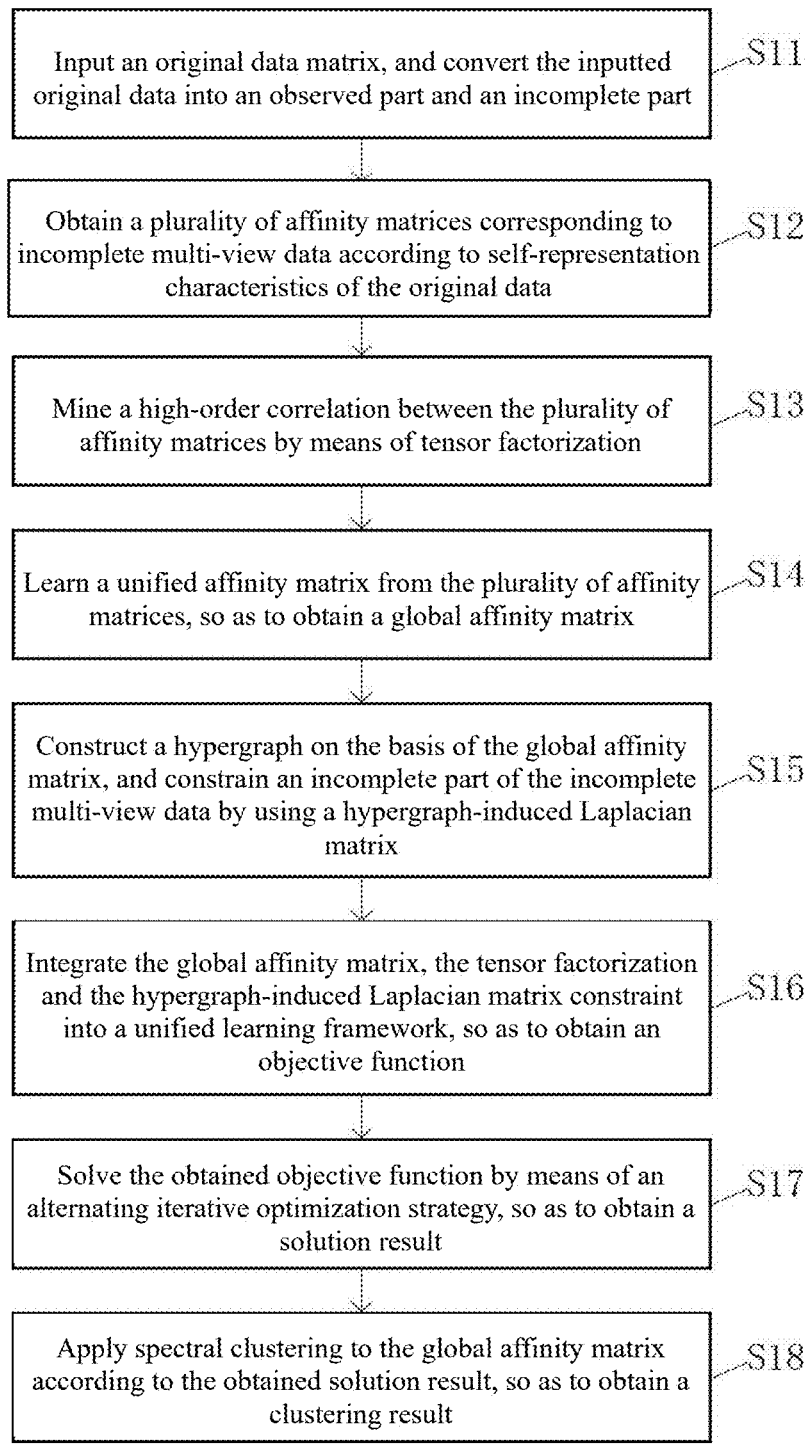
FIG. 1 is a flowchart of a high-order correlation preserved incomplete multi-view subspace clustering method according to Embodiment 1.

The high-order correlation preserved incomplete multi-view subspace clustering method provided by the present embodiment, as shown in FIG. 1, comprises:

S11, inputting an original data matrix, and converting the inputted original data into an observed part and an incomplete part;

S12, obtaining a plurality of affinity matrices corresponding to incomplete multi-view data according to self-representation characteristics of the original data;

S13, mining a high-order correlation between the plurality of affinity matrices by means of tensor factorization;

S14, learning a unified affinity matrix from the plurality of affinity matrices, so as to obtain a global affinity matrix;

S15, constructing a hypergraph on the basis of the global affinity matrix, and constraining an incomplete part of the incomplete multi-view data by using a hypergraph-induced Laplacian matrix;

S16, integrating the global affinity matrix, the tensor factorization and the hypergraph-induced Laplacian matrix constraint into a unified learning framework, so as to obtain an objective function;

S17, solving the obtained objective function by means of an alternating iterative optimization strategy, so as to obtain a solution result; and S18, applying spectral clustering to the global affinity matrix according to the obtained solution result, so as to obtain a clustering result.

Figure 2:
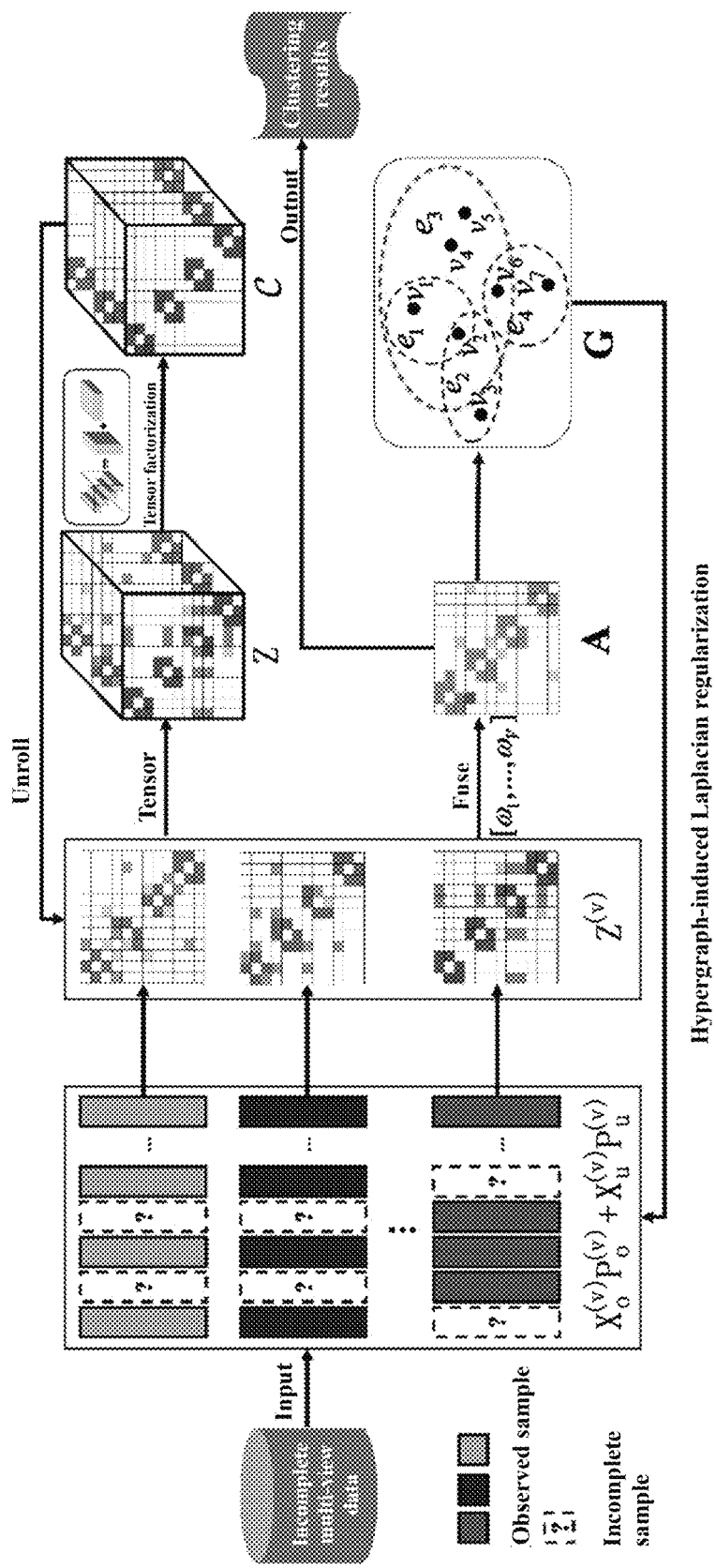
FIG. 2 is a block diagram of HCPIMSC according to Embodiment 1.
Figure 4A:
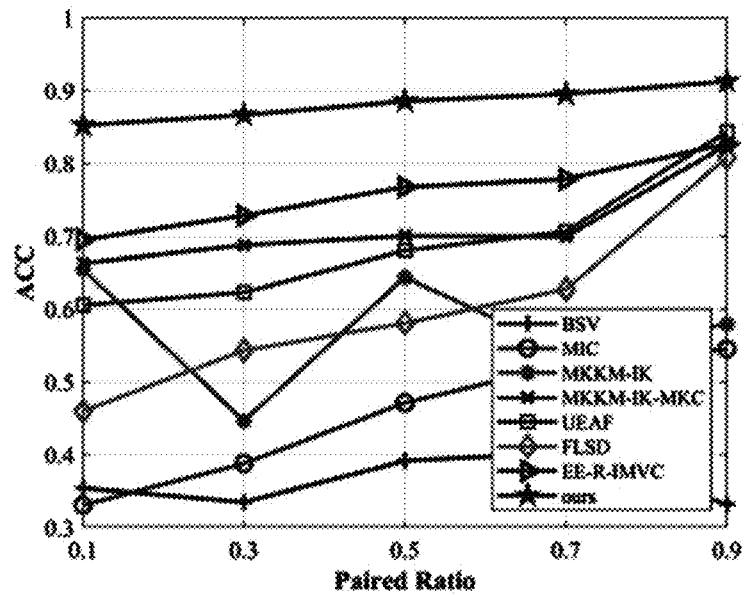
FIG. 4A-F are schematic diagrams of ACC results of different algorithms on six datasets with change of a paired ratio according to Embodiment 2.
Figure 4B:
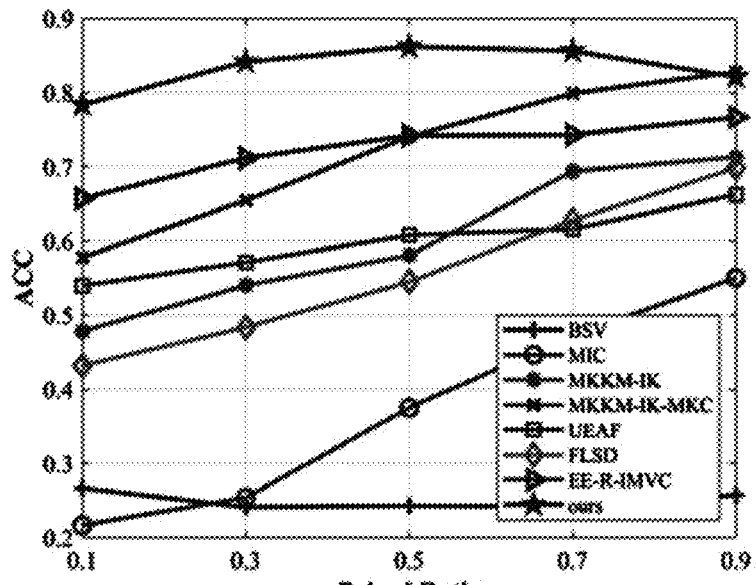
Figure 4C:
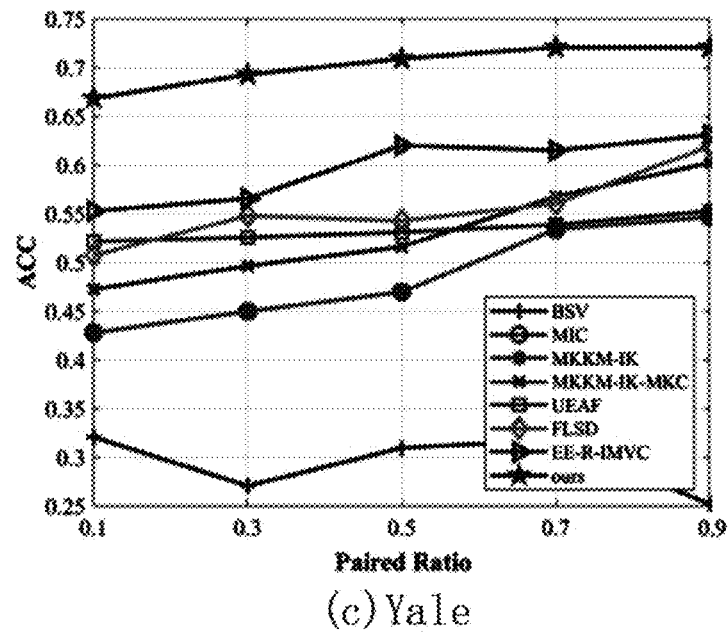
Figure 4D:
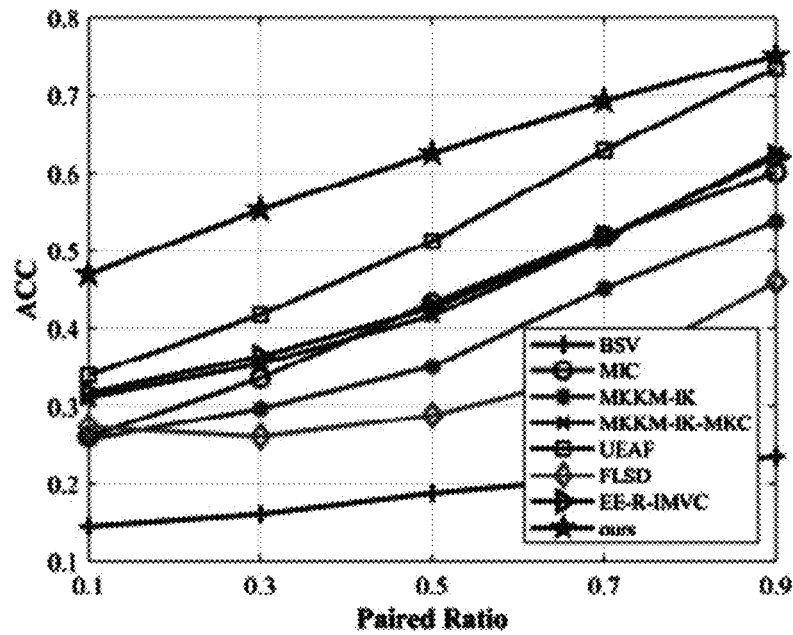
Figure 4E:
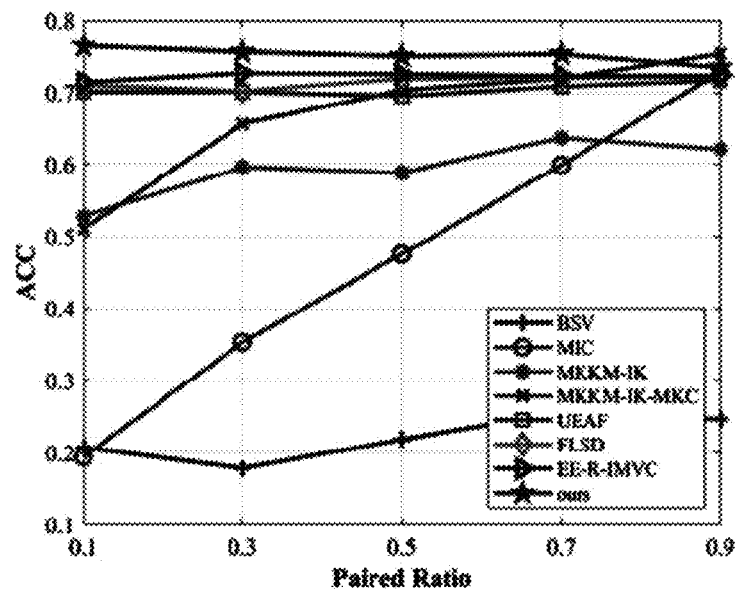
Figure 4F:
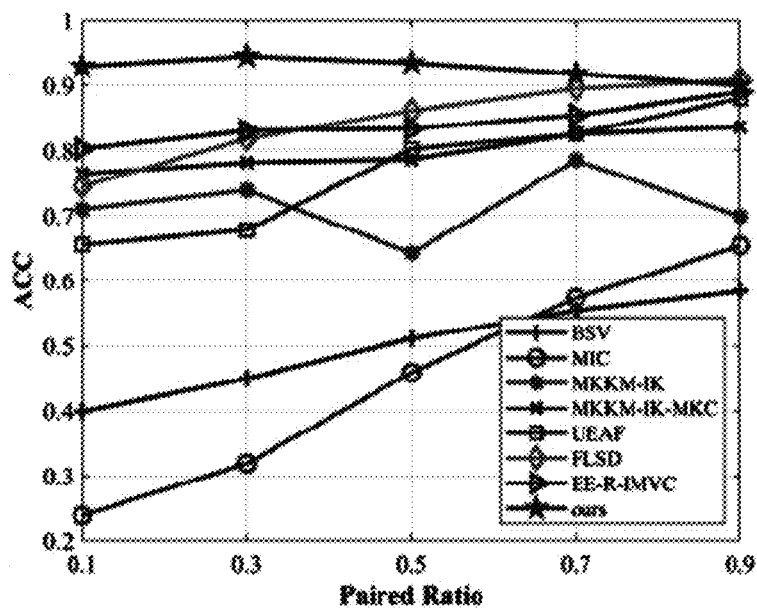
Figure 5A:
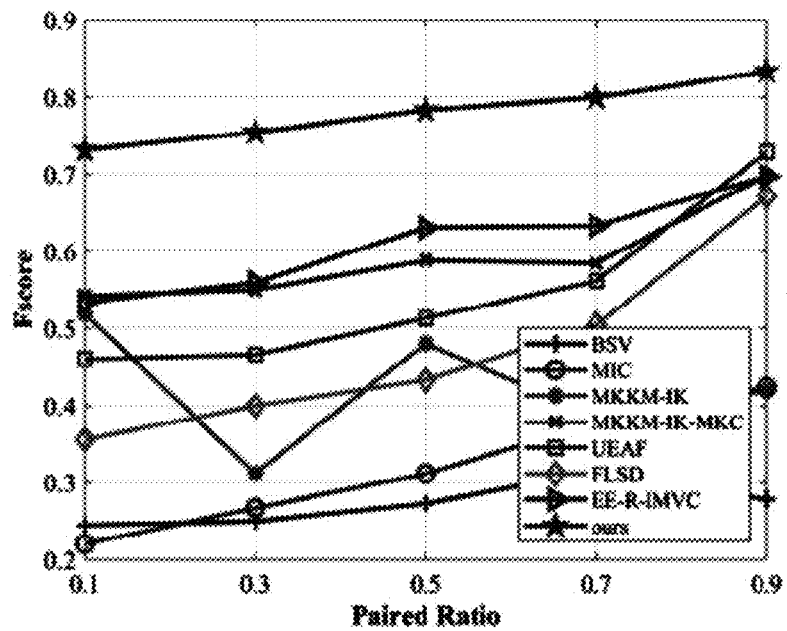
FIG. 5A-F are schematic diagrams of Fscore results of different algorithms on six datasets with change of a paired ratio according to Embodiment 2.
Figure 5B:
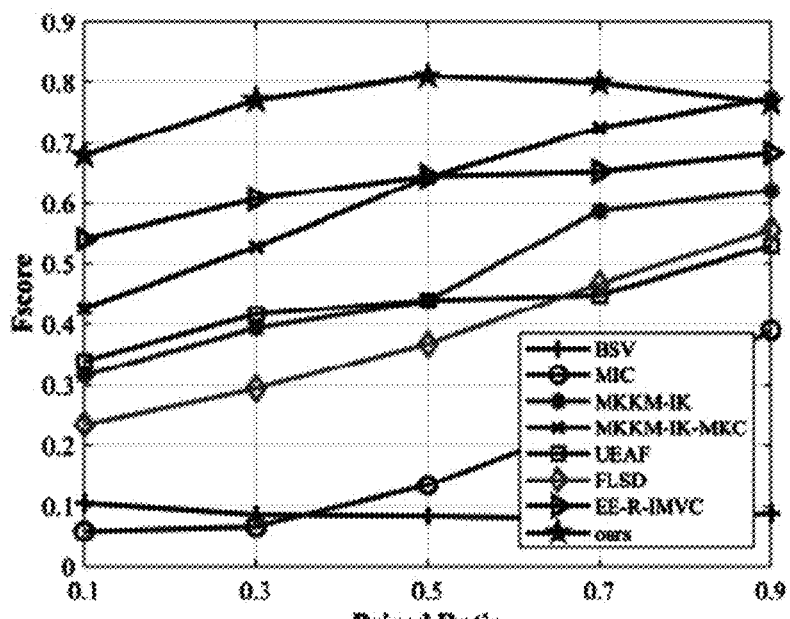
Figure 5C:
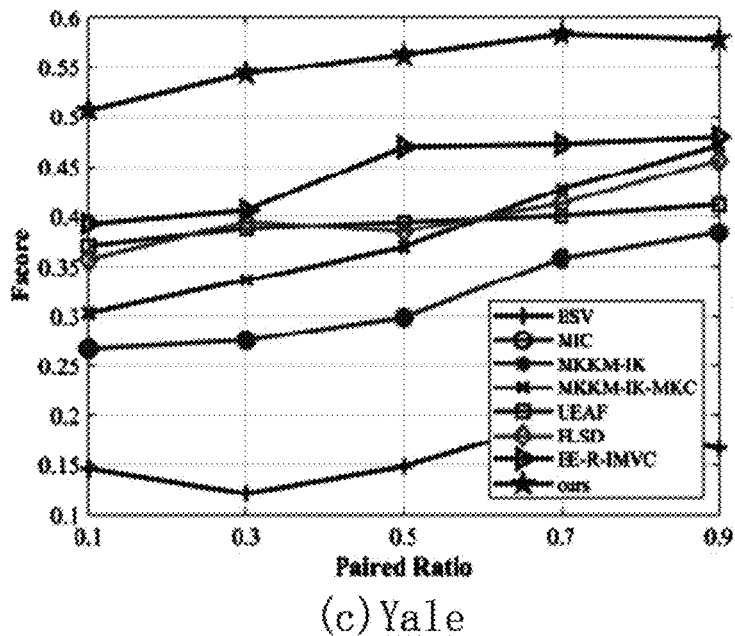
Figure 5D:
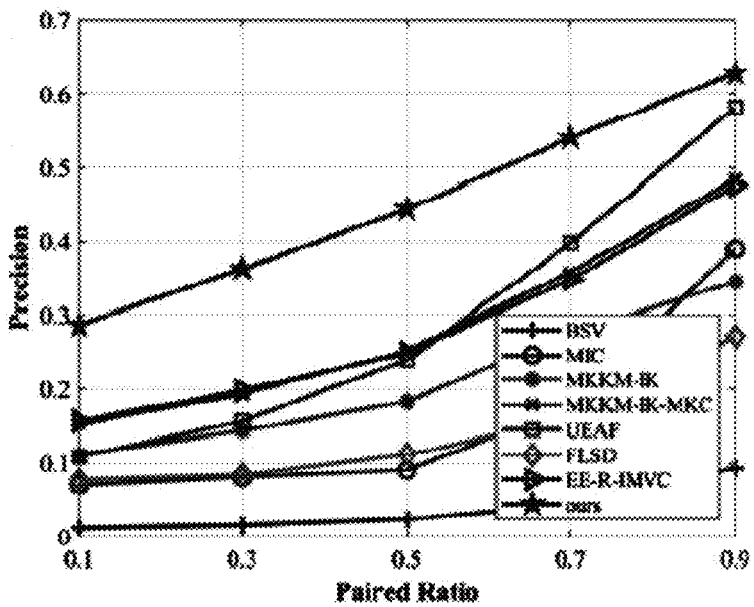
Figure 5E:
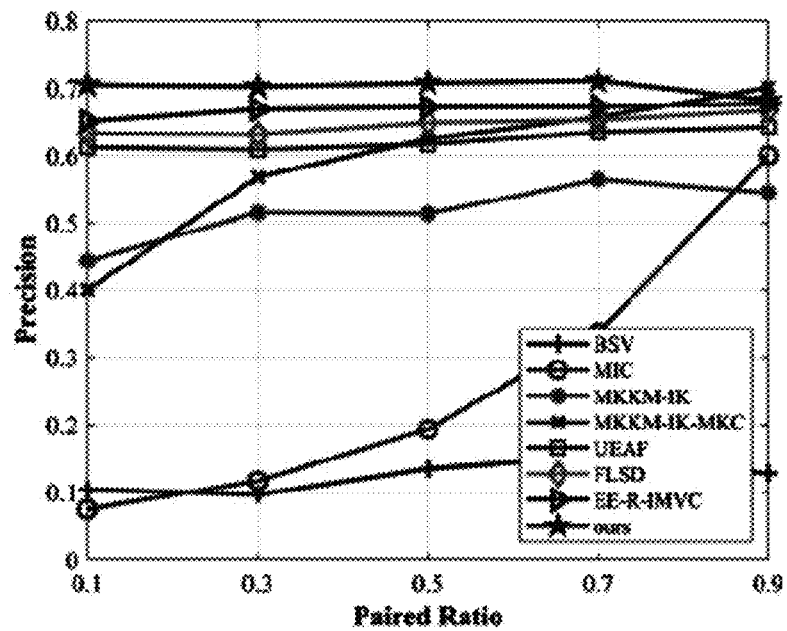
Figure 5F:
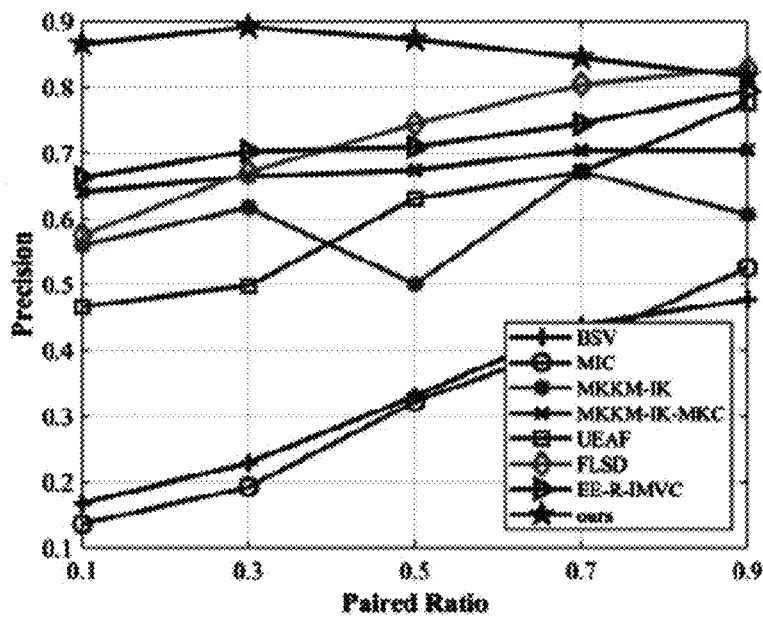
Figure 6A:
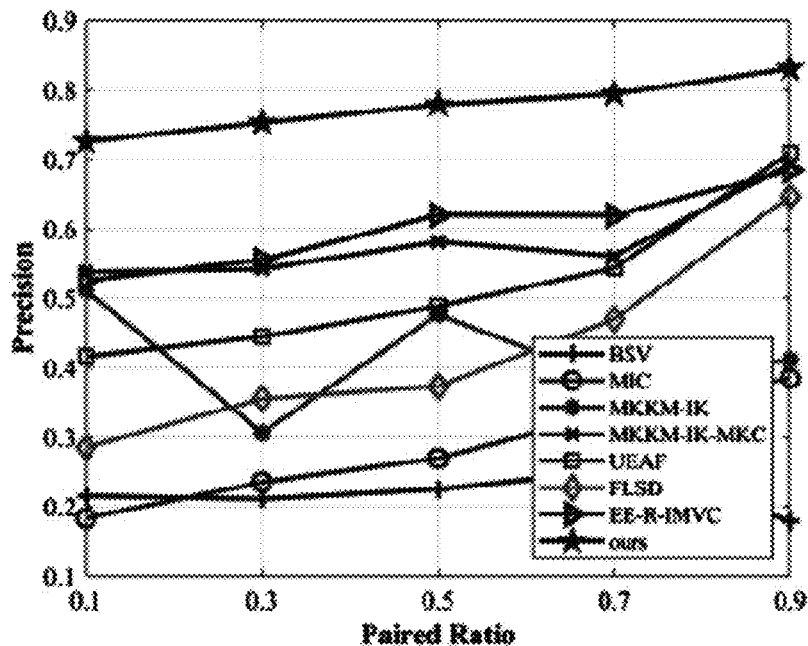
FIG. 6A-F are schematic diagrams of Precision results of different algorithms on six datasets with change of a paired ratio according to Embodiment 2.
Figure 6B:
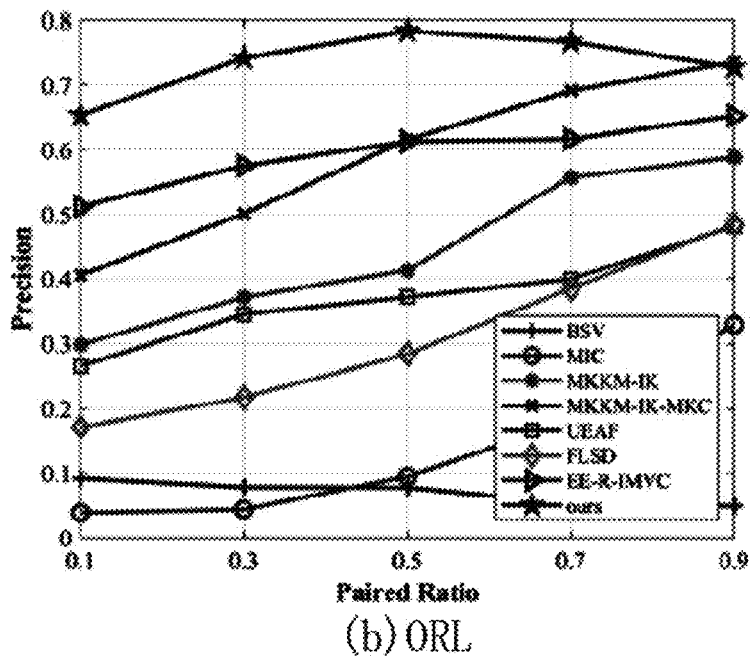
Figure 6C:
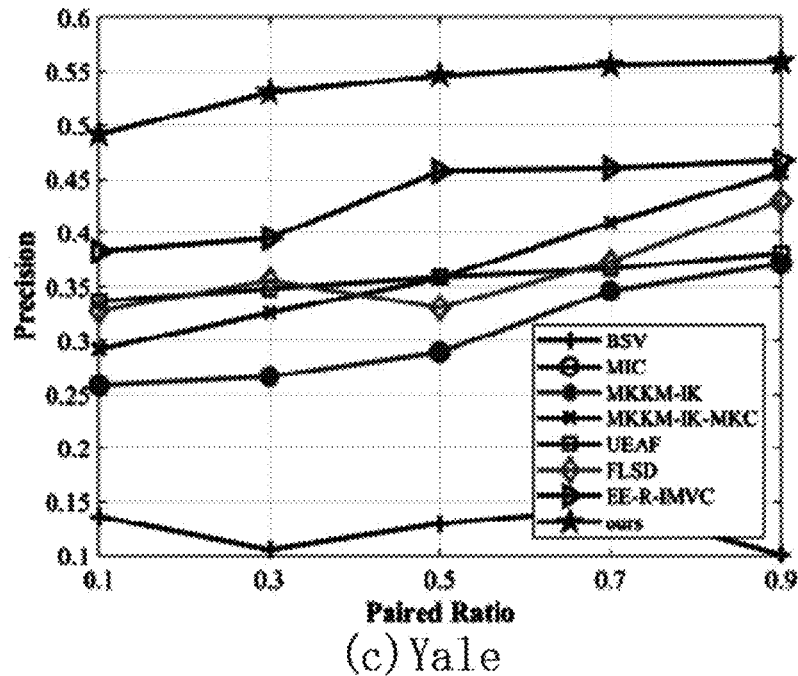
Figure 6D:
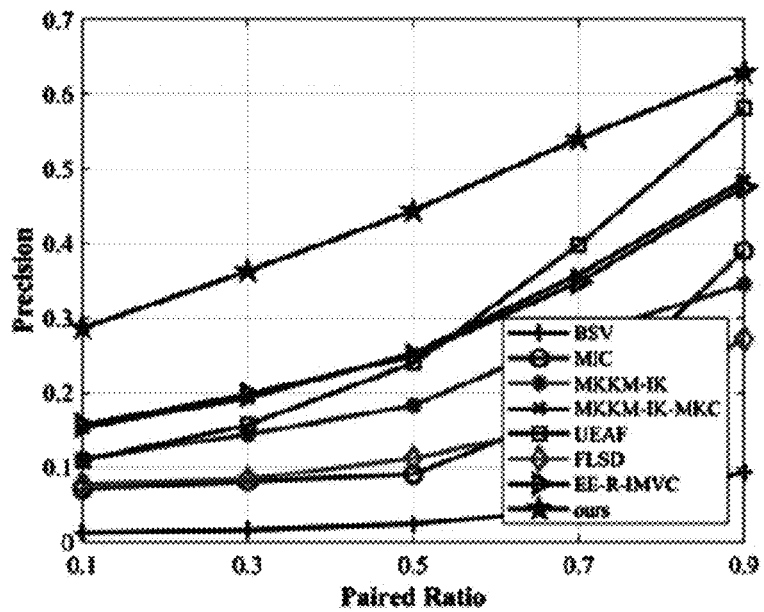
Figure 6E:
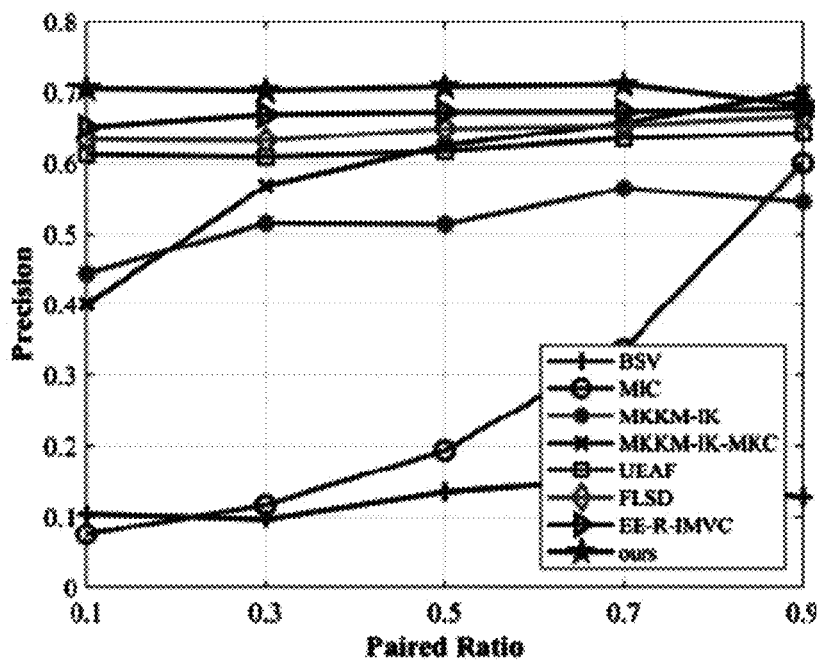
Figure 6F:
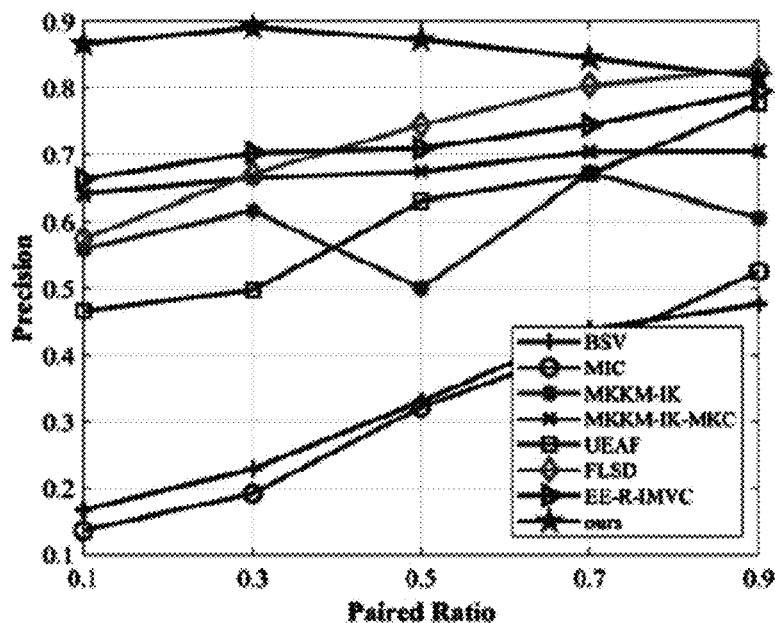
Figure 7A:
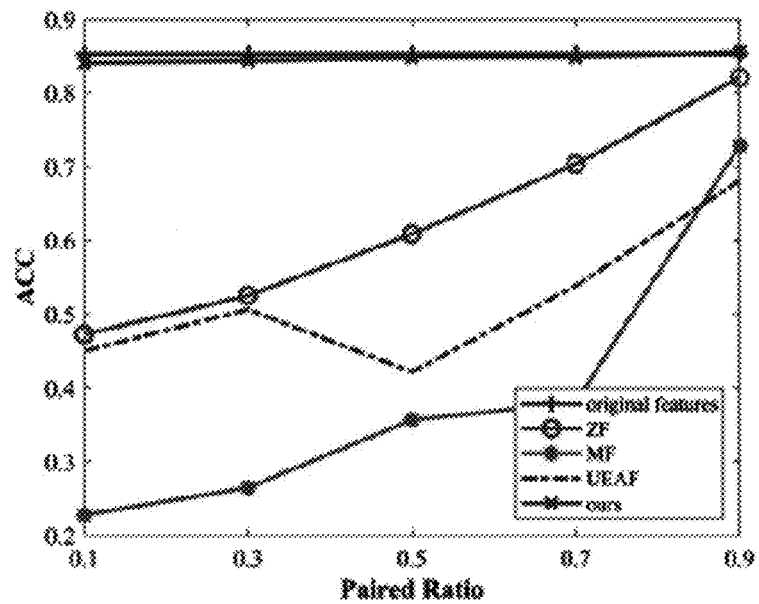
FIG. 7A-F are schematic diagrams of clustered ACC results of features filled on six synthetic incomplete multi-view datasets by different algorithms with change of a paired ratio according to Embodiment 2.
Figure 7B:
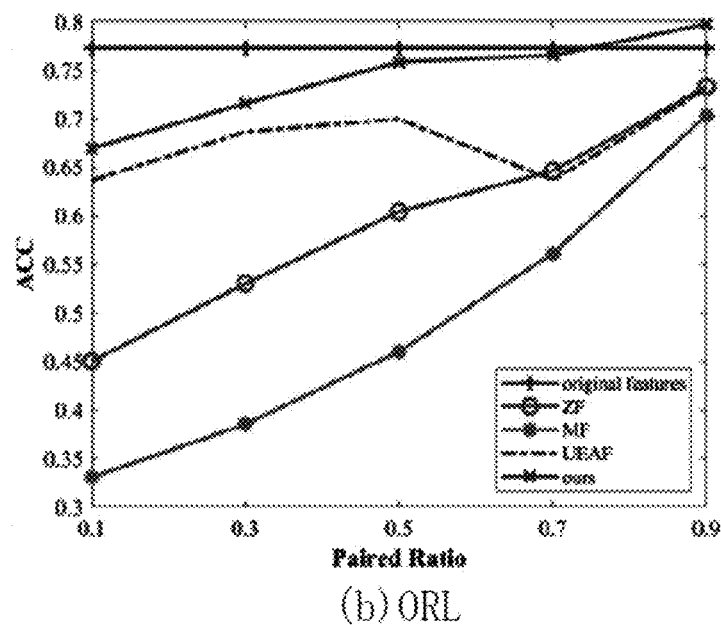
Figure 7C:
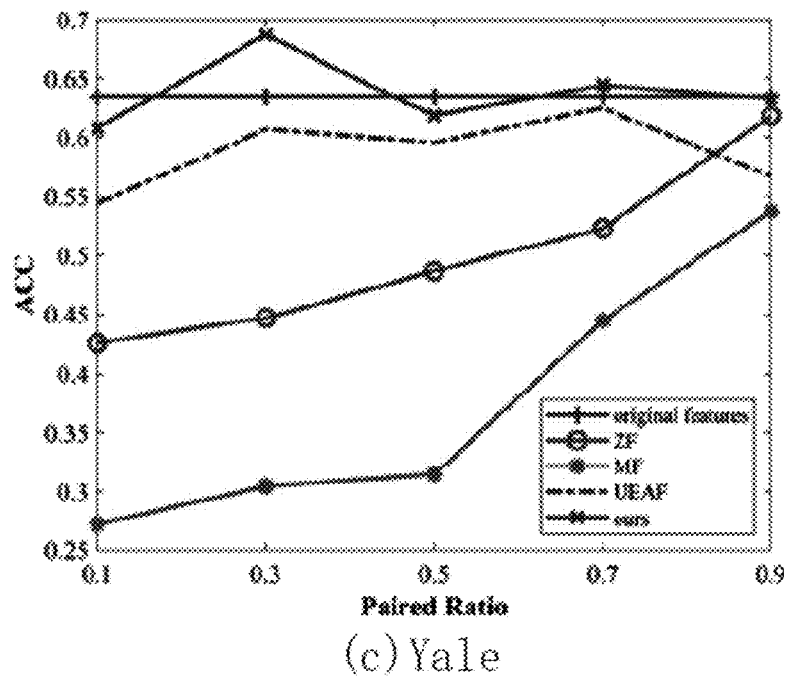
Figure 7D:
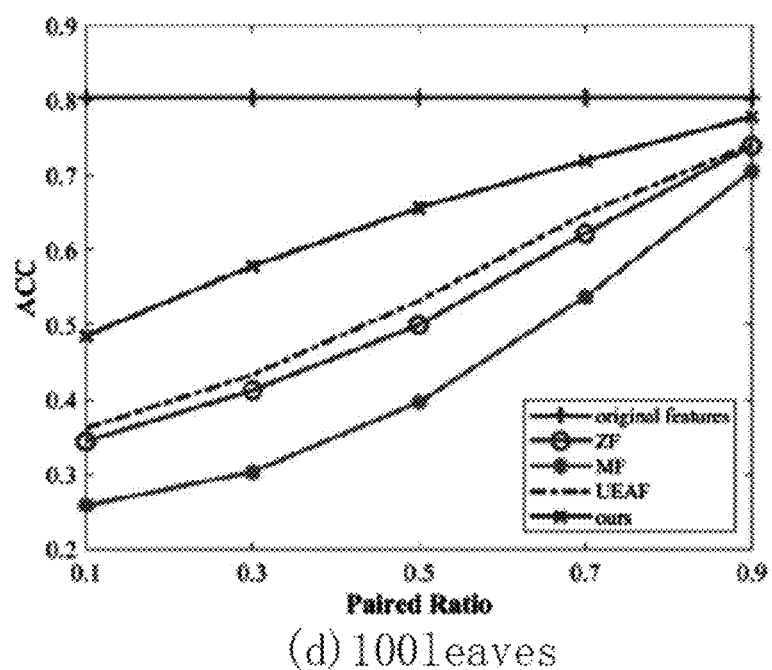
Figure 7E:
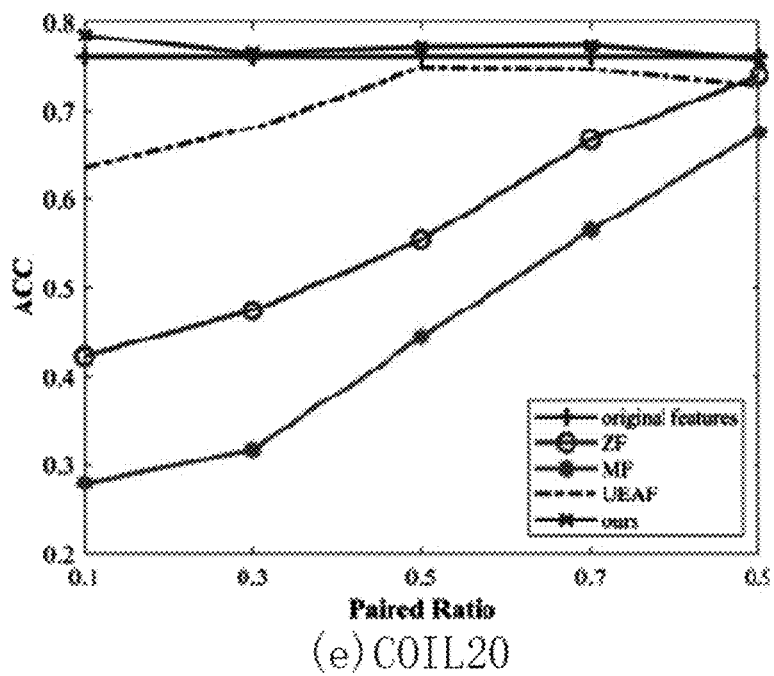
Figure 7F:
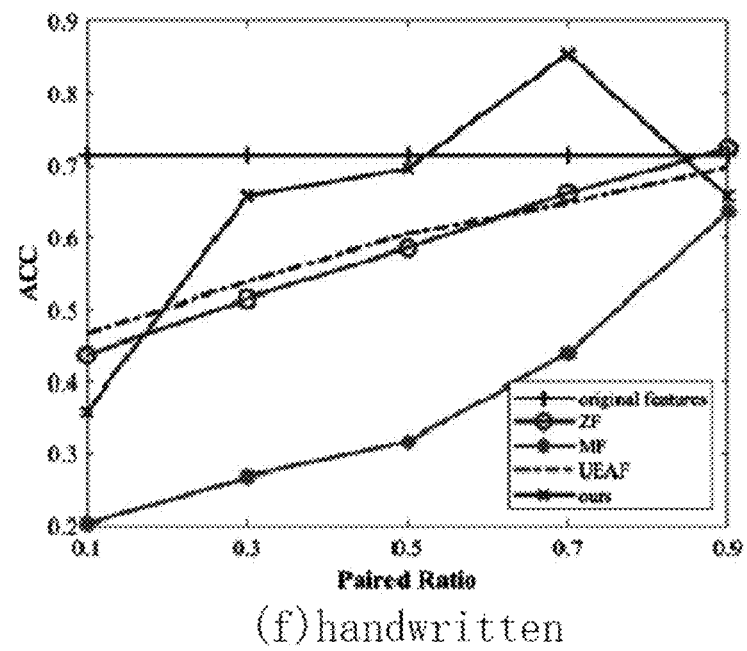
Figure 9A:
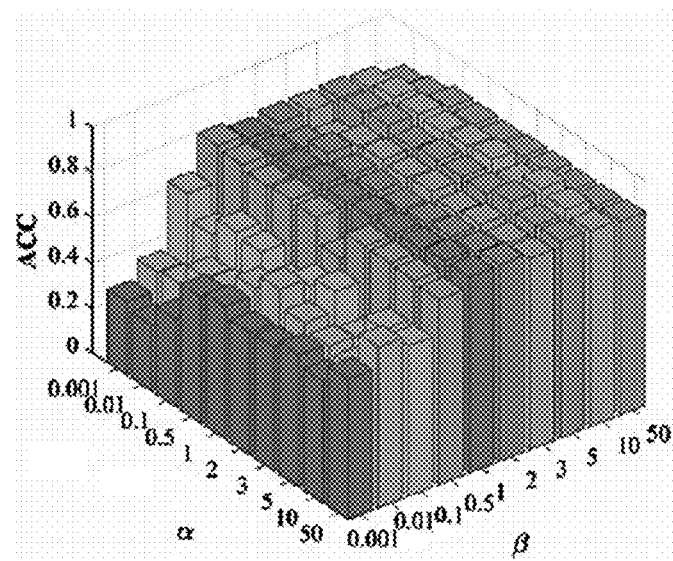
FIG. 9A-C are schematic diagrams of ACC results on three naturally incomplete multi-view datasets under different parameter combinations according to Embodiment 2.
Figure 9B:
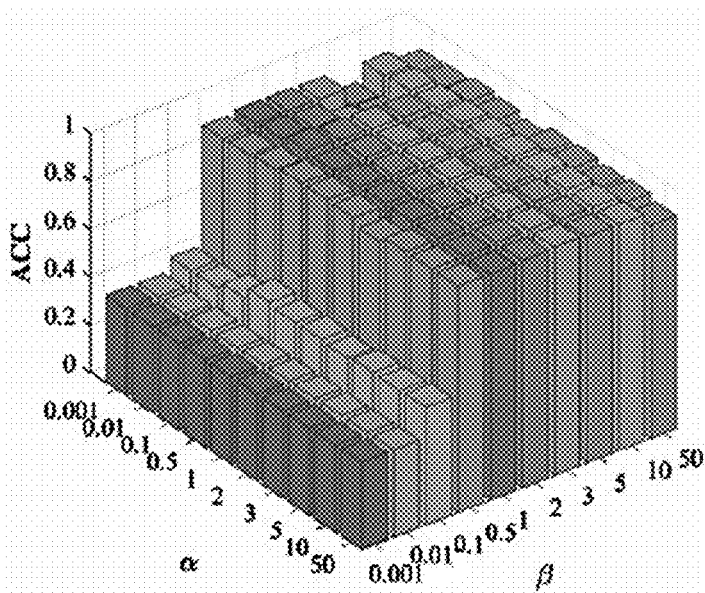
Figure 9C:
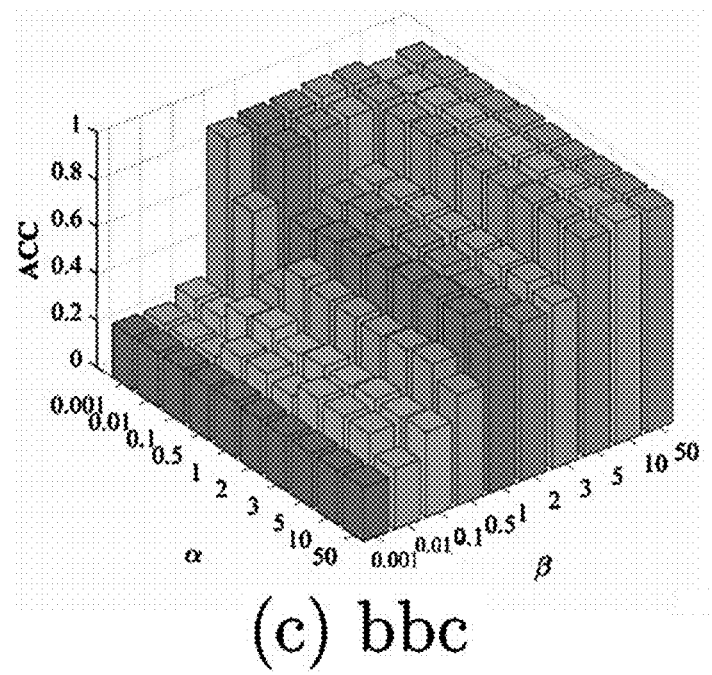
Figure 10A:
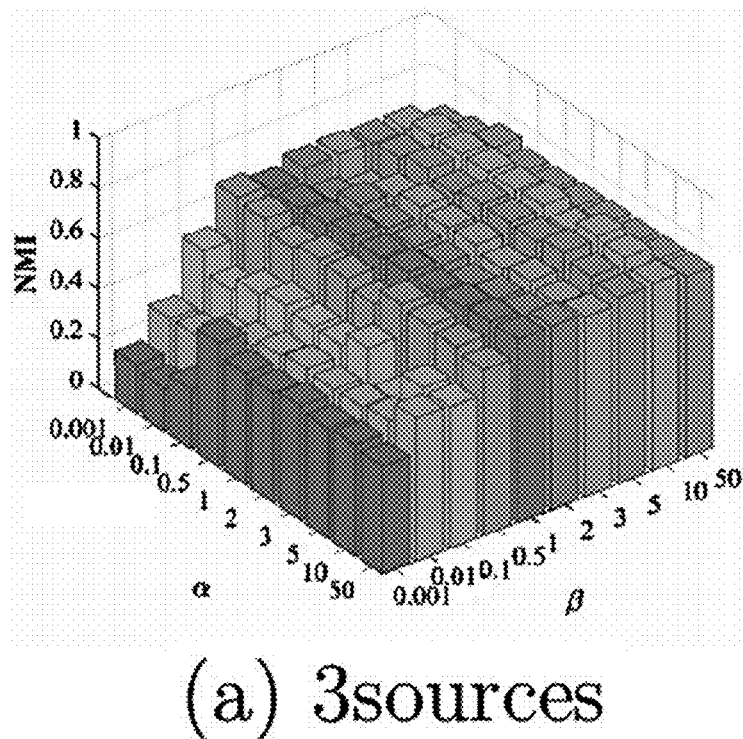
FIG. 10A-C are schematic diagrams of NMI results on three naturally incomplete multi-view datasets under different parameter combinations according to Embodiment 2.
Figure 10B:
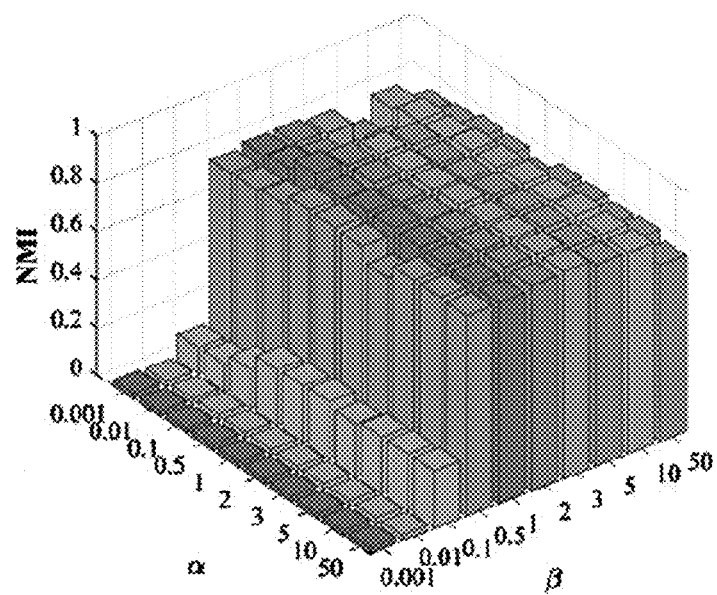
Figure 10C:
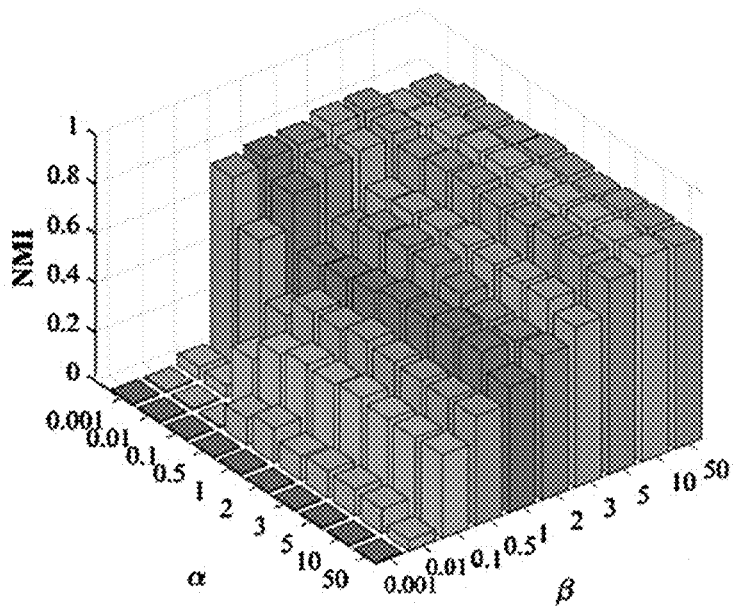
Figure 11A:
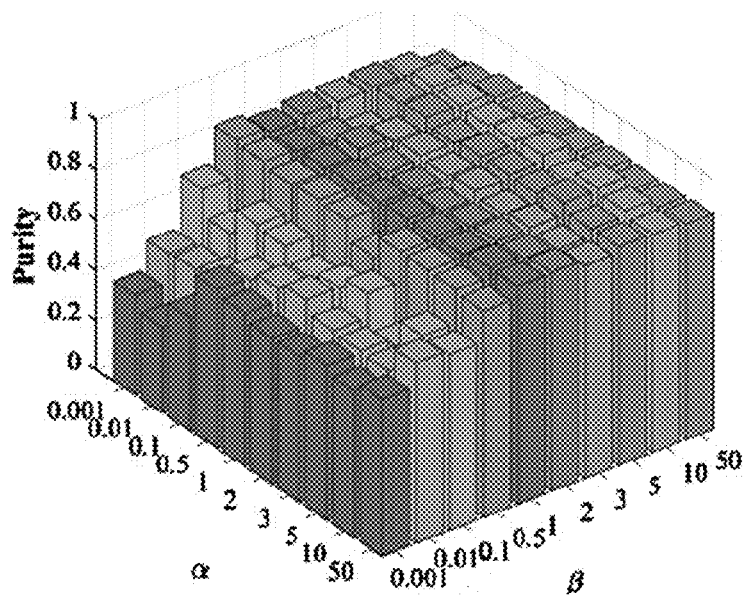
FIG. 11A-C are schematic diagrams of Purity results on three naturally incomplete multi-view datasets under different parameter combinations according to Embodiment 2.
Figure 11B:
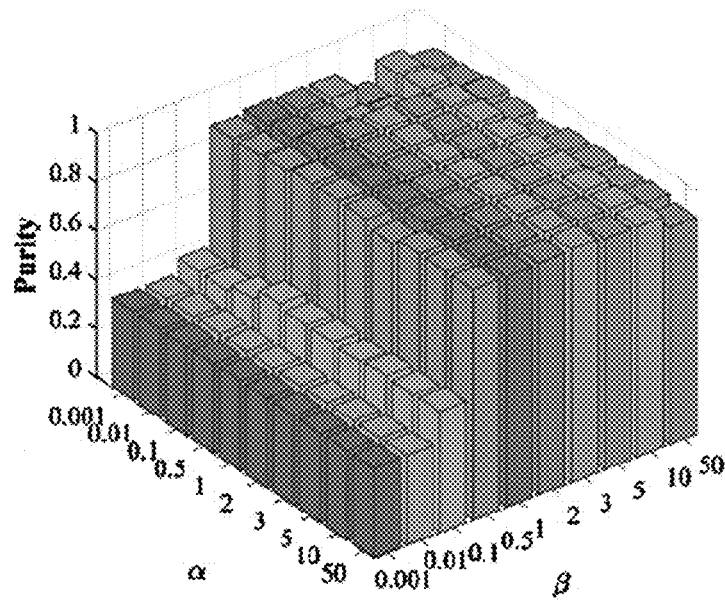
Figure 11C:
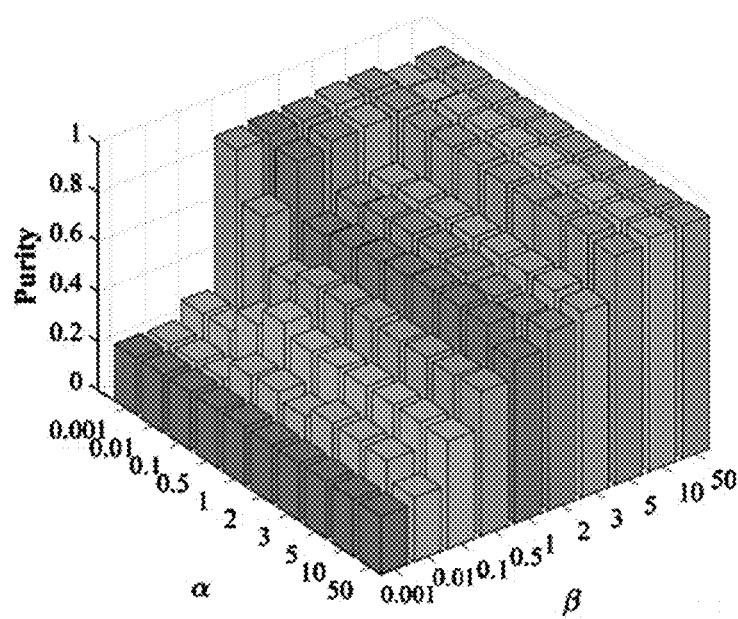

The high-order correlation preserved incomplete multi-view subspace clustering (HCPIMSC) method provided by the present embodiment can effectively recover incomplete samples and underlying subspace structures of the multi-view data. In particular, the plurality of affinity matrices learned from the multi-view data can be regarded as a low-rank third-order tensor, and the present embodiment utilizes a tensor factorization constraint to capture high-order correlations between views and between samples. Then, the present embodiment learns a unified affinity matrix from view-specific affinity matrices by using a self-weighting strategy, which can efficiently describe the underlying subspace structures of the multi-view data. To capture a high-order geometric result of an inner part of a view with incomplete samples, the present embodiment derives a hypergraph from the unified affinity matrix and constrains the incomplete samples to be located near their neighbor samples by using a hypergraph-induced Laplacian regularization. Finally, the present embodiment integrates affinity matrix learning, tensor factorization and hypergraph-induced Laplacian regularization into a unified learning framework. On the basis of the obtained global affinity matrix, a clustering result can be obtained. FIG. 2 shows a block diagram of the algorithm of the HCPIMSC method.

In S11, an original data matrix is inputted, and the inputted original data is converted into an observed part and an incomplete part.

Mining complementary information between views becomes more difficult due to incomplete samples in the views. To reduce a gap between processing incomplete multi-view data and complete multi-view data, the present embodiment introduces a mapping function, which divides the inputted original data into an observed part and an incomplete part, and is specifically represented as:

$$X^{(v)} = X_o^{(v)} P_o^{(v)} + X_u^{(v)} P_u^{(v)}$$

wherein, $X^{(v)} \in R^{d_v \times n}$ represents a feature matrix of a v-th view; n represents the number of samples; $d_v$ represents the number of features in the v-th view; $X_o^{(v)} \in R^{d_v \times n_v}$ represents a feature matrix observed in the v-th view; $n_v$ represents the number of samples observed in the v-th view; $X_u^{(v)} \in R^{d_v \times (n-n_v)}$ represents incomplete samples in the v-th view, which will be automatically filled in the algorithm; $P_o^{(v)} \in R^{n_v \times n}$ and $P_u^{(v)} \in R^{(n-n_v) \times n}$ represent that two transformation matrices map the observed samples and incomplete samples into a same matrix, and their elements are defined as follows, $$p_{oij}^{(v)} = \begin{cases} 1, & \text{if } x_{oi}^{(v)} \text{ corresponds to } x_j^{(v)} \\ 0, & \text{otherwise} \end{cases}$$

$$p_{uij}^{(v)} = \begin{cases} 1, & \text{if } x_{ui}^{(v)} \text{ corresponds to } x_j^{(v)} \\ 0, & \text{otherwise} \end{cases}$$

wherein, $p_{o}^{(v)}{}_{ij}$ represents an i-th row and a j-th column of a matrix $p_o^{(v)}$; $p_u^{(v)}{}_{ij}$ represents an i-th row and a j-th column of a matrix $p_u^{(v)}$; $x_o^{(v)}{}_i$ represents an i-th column of a matrix $x_o^{(v)}$; $x_j^{(v)}$ represents a j-th column of a matrix $x^{(v)}$; $x_u^{(v)}{}_i$ represents an i-th column of a matrix $x_u^{(v)}$.

In S12, a plurality of affinity matrices corresponding to incomplete multi-view data are obtained according to self-representation characteristics of the original data.

On the basis of a tensor tubal rank, the present embodiment represents an affinity matrix corresponding to the incomplete multi-view data as follows, $$\min_{X_u^{(v)}, Z^{(v)}} \sum_{v=1}^{V} \left\| X^{(v)} - X^{(v)} Z^{(v)} \right\|_F^2 + \beta \mathrm{rank}_t(Z)$$

$$\text{s.t. } \mathrm{diag}(Z^{(v)}) = 0, Z_{ij}^{(v)} \geq 0, Z^{(v)} = Z^{(v)T}, Z = \Phi(Z^{(1)}, Z^{(2)}, \ldots, Z^{(V)})$$

wherein, $\mathrm{diag}(Z^{(v)})=0$, $Z_{ij}^{(v)}\geq 0$ and $Z^{(v)}=Z^{(v)T}$ are constrained such that a matrix $Z^{(v)} \in R^{n \times n}$ represents an affinity matrix of a v-th view; $\beta$ represents a penalty parameter; $Z \in R^{n \times n \times V}$ represents a tensor; $\Phi(\ )$ represents converting a matrix into a tensor; V represents the number of views; $Z_{ij}^{(v)}$ represents an i-th row and a j-th column of the matrix $Z^{(v)}$; $Z^{(v)}$ represents transpose of the matrix $Z^{(v)}$; $\|\ \|_F^2$ represents a Frobenius norm.

As an affinity matrix of each view describes a subspace structure, ideally there should be a block diagonal result. In addition, as the multi-view data has potential semantic consistency, each slice of the tensor Z should have a similar block diagonal structure. Then, Z should ideally be a block diagonal tensor, and meanwhile, Z has a low-rank feature. Therefore, the present embodiment constrains Z to be a low-rank tensor to capture a block diagonal result therein.

In S13, a high-order correlation between the plurality of affinity matrices is mined by means of tensor factorization.

A tensor nuclear norm is a computable constraint that is used in place of the tensor tubal rank to constrain a tensor lower-order structure. However, computation of tensor singular value factorization of an n×n×V tensor needs to take computational complexity of $O(n^2 V \log(V)+n^3 V)$, and computation cost is large. Assuming a tensor tubal rank of Z is ĉ, Z can be factorized into a pattern of a tensor product, such as: Z=U*V, wherein $U \in R^{n \times \hat{c} \times V}$ and $V \in R^{\hat{c} \times n \times V}$ are two tensors with smaller sizes, satisfying $\mathrm{rank}_t(U)=\mathrm{rank}_t(V)=\hat{c}$. According to the tensor product, we have $\mathrm{rank}_t(U*V) \leq \min(\mathrm{rank}_t(U),\mathrm{rank}_t(V))$. Thus, by adjusting sizes of the tensors U and V, a tensor tubal rank of Z can be controlled. In addition, tensor factorization has smaller computation cost. The formula is rewritten as follows:

$$\min_{X_u^{(v)}, Z^{(v)}, U, V} \sum_{v=1}^{V} \left\| X^{(v)} - X^{(v)} Z^{(v)} \right\|_F^2 + \beta \| Z - U*V \|_F^2$$

$$\text{s.t. } Z = \Phi(Z^{(1)}, Z^{(2)}, \ldots, Z^{(V)}), \mathrm{diag}(Z^{(v)}) = 0, Z_{ij}^{(v)} \geq 0, Z^{(v)} = Z^{(v)T}$$

wherein, $U \in R^{n \times \hat{c} \times V}$ and $V \in R^{\hat{c} \times n \times V}$ represent two tensors with smaller sizes, satisfying $\mathrm{rank}_t(U)=\mathrm{rank}_t(V)=\hat{c}$, and $\mathrm{rank}_t$, represents a tensor tubal rank; ĉ represents a positive integer.

In S14, a unified affinity matrix is learned from the plurality of affinity matrices, so as to obtain a global affinity matrix.

As different views may have different numbers of incomplete samples, they will contribute different information to a clustering task. To learn a unified class cluster structure for incomplete multi-view data, the present embodiment uses a self-weighting strategy to learn a unified affinity A from an affinity matrix $\{Z^{(v)}\}_{v=1}^V$ of view features. The objective function can be represented as follows:

$$\min_A \omega_v \left\| Z^{(v)} - A \right\|_F^2 \text{ s.t. } \omega_v = \frac{1}{2 \left\| Z^{(v)} - A \right\|_F}$$

wherein, $\omega_v$ represents a weight of the v-th view; and A represents the global affinity matrix.

In S15, a hypergraph is constructed on the basis of the global affinity matrix, and an incomplete part of the incomplete multi-view data is constrained by using a hypergraph-induced Laplacian matrix.

Incomplete samples in each view are reconstructed by using other linear combinations based on a view-specific affinity matrix. However, the view-specific affinity matrix does not describe well an underlying class cluster structure of the data due to incomplete views and view clustering capability differences. On the basis of the unified affinity matrix, the present embodiment constrains the incomplete samples to be reconstructed near their neighbor samples by using a hypergraph-induced Laplacian regularization. The regularization constraint can be represented as follows:

$$\min_{X_u^{(v)}} \frac{1}{2} \sum_{e \in E} \sum_{(i,j) \in e} \frac{w(e)}{d(e)} \left\| x_{ui}^{(v)} - x_j^{(v)} \right\|^2$$

wherein, w(e) and d(e) represent an edge weight and a degree of a hyperedge e; $x_u^{(v)}{}_i$ and $x_j^{(v)}$ represent the i-th and j-th samples of an incomplete feature matrix and a complete feature matrix, respectively. The above formula can be further rewritten in a matrix form as follows:

$$\min_{X_u^{(v)}} Tr\left( X^{(v)} L_h X^{(v)T} \right)$$

wherein, $L_h$ represents a hypergraph Laplacian matrix constructed on the basis of a global affinity matrix. Compared with a traditional Laplacian matrix, the hypergraph Laplacian matrix can better maintain a correlation among three or more vertexes and has a high-order correlation preserved feature. Thus, it can promote filling of incomplete samples.

In S16, the global affinity matrix, the tensor factorization and the hypergraph-induced Laplacian matrix constraint are integrated into a unified learning framework, so as to obtain an objective function.

The objective function of the high-order correlation preserved incomplete multi-view subspace clustering method proposed in the present embodiment can be represented as follows:

$$\min_{X_u^{(v)}, A, Z^{(v)}, U, V} \sum_{v=1}^{V} (\|X^{(v)} - X^{(v)} Z^{(v)}\|_F^2 +$$

$$\omega_v \|Z^{(v)} - A\|_F^2 + \alpha Tr(X^{(v)} L_h X^{(v)T})) + \beta \|Z - U * V\|_F^2$$

s.t. $Z = \Phi(Z^{(1)}, Z^{(2)}, \ldots, Z^{(V)})$, diag$(Z^{(v)}) =$ $$0, Z_{ij}^{(v)} \geq 0, Z^{(v)} = Z^{(v)T}, \omega_v = \frac{1}{2\|Z^{(v)} - A\|_F}$$

wherein, $\alpha$ represents a penalty parameter. The first item learns the view-specific affinity matrices and the second item fuses them into a unified affinity matrix. The HCPIMSC algorithm preserves high-order correlations between views and between samples by using tensor factorization and hypergraph-induced Laplacian regularization, thereby thoroughly mining complementary information between the views, and achieving aims of better recovering incomplete samples and improving clustering effects.

In S17, the obtained objective function is solved by means of an alternating iterative optimization strategy, so as to obtain a solution result.

Specifically, in S171, when variables A, $\{X_u^{(v)}\}_{v=1}^{V}$, U and V are fixed, the objective function is represented as:

$$\min_{Z^{(v)}} \|X^{(v)} - X^{(v)} Z^{(v)}\|_F^2 + \|Z^{(v)} - B^{(v)}\|_F^2$$

s.t. diag$(Z^{(v)}) = 0, Z_{ij}^{(v)} \geq 0, Z^{(v)} = Z^{(v)T}$ wherein, $B^{(v)}$ represents a v-th forward slice of a tensor B; the tensor B is obtained by B=U*V. Next, the present embodiment approaches a $Z^{(v)}$ optimal solution using a two-step optimization strategy. The present embodiment first obtains an optimal solution of the objective function in an unconstrained state, and then maps the solution into a space spanned by constraint items, thereby obtaining a final solution of the objective function.

A derivative of the objective function is solved and set to be 0, and a solution of the variable $Z^{(v)}$ is as follows:

$$Z^{(v)} = (I + Q^{(v)})^{-1}(Q^{(v)} + B^{(v)})$$

wherein, $Q^{(v)}$ represents an intermediate matrix, and is obtained by calculating $Q^{(v)} = X^{(v)T} X^{(v)}$;

Then, the present embodiment obtains the optimal solution of $Z^{(v)}$ by optimizing the following problem:

$$\min_{Z^{(v)}} \|Z^{(v)} - \hat{Z}^{(v)}\|_F^2$$

s.t. $Z_{ij}^{(v)} \geq 0, Z^{(v)} = Z^{(v)T}$ wherein, $\hat{Z}^{(v)}$ represents an intermediate matrix, and is obtained by calculating $\hat{Z}^{(v)} = Z^{(v)} - \text{diag}(\text{diag}(Z^{(v)}))$; and The optimal solution of the objective function is as follows:

$$Z^{(v)} = [(\hat{Z}^{(v)} + \hat{Z}^{(v)T})/2]_+$$

wherein, $\hat{Z}^{(v)T}$ represents transpose of the matrix $Z^{(v)}$;

in S172, when variables $\{Z^{(v)}\}_{v=1}^{V}$, $\{X_u^{(v)}\}_{v=1}^{V}$, U, and V are fixed, the objective function can be rewritten as follows:

$$\min_A \sum_{v=1}^{V} \omega_v \|Z^{(v)} - A\|_F^2$$

A derivative of the objective function is solved and set to be 0, and a solution of A is as follows:

$$A = \frac{\sum_{v=1}^{V} \omega_v Z^{(v)}}{\sum_{v=1}^{V} \omega_v}$$

in S173, when variables $\{Z^{(v)}\}_{v=1}^{V}$, A, U and V are fixed, the variables are substituted into a formula $X^{(v)} = X_o^{(v)} P_o^{(v)} + X_u^{(v)} P_u^{(v)}$, and the objective function is represented as:

$$\min_{X_u^{(v)}} \alpha Tr\big((X_o^{(v)} P_o^{(v)} + X_u^{(v)} P_u^{(v)}) L_h (X_o^{(v)} P_o^{(v)} + X_u^{(v)} P_u^{(v)})^T\big) +$$

$$\|(X_o^{(v)} P_o^{(v)} + X_u^{(v)} P_u^{(v)})(Z^{(v)} - I_n)\|_F^2$$

A derivative of the objective function is derived and set to be 0, and a solution of $X_u^{(v)}$ is as follows:

$$X_u^{(v)} = (X_o^{(v)} P_o^{(v)} M^{(v)} P_u^{(v)T})(P_u^{(v)}) M^{(v)} P_u^{(v)T})^{-1}$$

wherein, $M^{(v)}$ represents an intermediate matrix, and is obtained by calculating $M^{(v)} = (Z^{(v)} - I)(Z^{(v)T} - I) + \alpha L_h$; I represents an identity matrix;

In S174, when variables $\{Z^{(v)}\}_{v=1}^{V}$, A, $\{X_u^{(v)}\}_{v=1}^{V}$, and V are fixed, the objective function can be rewritten as follows:

$$\min_U \|Z - U * V\|_F^2$$

$\overline{Z}$, $\overline{U}$ and $\overline{V}$ are made to represent results of a fast Fourier transform of the tensors Z, U and V along the third dimension, respectively. The results are substituted into a formula $$U * V = \sum_{v=1}^{V} \overline{U}^{(v)} \overline{V}^{(v)},$$

and the objective function can be rewritten as follows:

$$\min_{\bar{U}^{(v)}} \|\bar{Z}^{(v)} - \bar{U}^{(v)} \bar{V}^{(v)}\|_F^2$$

A derivative of the objective function is derived and set to be 0, and a solution of the variable $\bar{U}^{(v)}$ is as follows:

$$\bar{U}^{(v)} = \bar{Z}^{(v)} \bar{V}^{(v)*} \left( \bar{V}^{(v)} \bar{V}^{(v)*} \right)^{-1}$$

wherein, $\bar{U}^v$ represents a v-th slice of the tensor $\bar{U}$; $\bar{Z}^{(v)}$ represents a v-th slice of the tensor $\bar{Z}$; $\bar{V}^{(v)}$ represents a v-th slice of the tensor $\bar{V}$; $\bar{V}^{(v)*}$ represents conjugate transpose of a matrix $\bar{V}^{(v)}$; and In S175, when variables $\{\bar{Z}^{(v)}\}_{v=1}^V$, A, $\{X_u^{(v)}\}_{v=1}^V$, and U are fixed, the objective function can be rewritten as follows:

$$\min_{\bar{V}^{(v)}} \|\bar{Z}^{(v)} - \bar{U}^{(v)} \bar{V}^{(v)}\|_F^2$$

A derivative of the objective function is derived and set to be 0, and a solution of the variable $\bar{V}^{(v)}$ is as follows:

$$\bar{V}^{(v)} = \left( \bar{V}^{(v)*} \bar{V}^{(v)} \right)^{-1} \bar{V}^{(v)*} \bar{Z}^{(v)}.$$

The present embodiment provides a high-order correlation preserved incomplete multi-view subspace clustering (HCPIMSC) method. Compared with other incomplete multi-view clustering algorithms, such as LT-MSC, MLAN, GMC, SM2SC and the like, the HCPIMSC method preserves high-order correlations between views and between samples by using tensor factorization and hypergraph-induced Laplacian regularization, thereby thoroughly mining complementary information between the views, and achieving aims of better recovering incomplete samples and improving clustering effects. FIG. 2 shows a block diagram of the algorithm of the HCPIMSC method.

Correspondingly, the present embodiment further provides a high-order correlation preserved incomplete multi-view subspace clustering system, which comprises:
an input module, configured to input an original data matrix and convert the inputted original data into an observed part and an incomplete part;
an acquiring module, configured to obtain a plurality of affinity matrices corresponding to incomplete multi-view data according to self-representation characteristics of the original data;
a mining module, configured to mine a high-order correlation between the plurality of affinity matrices by means of tensor factorization;
a unifying module, configured to learn a unified affinity matrix from the plurality of affinity matrices, so as to obtain a global affinity matrix;
a constraining module, configured to construct a hypergraph on the basis of the global affinity matrix, and constrain an incomplete part of the incomplete multi-view data by using a hypergraph-induced Laplacian matrix;
an integrating module, configured to integrate the global affinity matrix, the tensor factorization and the hypergraph-induced Laplacian matrix constraint into a unified learning framework, so as to obtain an objective function;
a solving module, configured to solve the obtained objective function by means of an alternating iterative optimization strategy, so as to obtain a solution result; and
a clustering module, configured to apply spectral clustering to the global affinity matrix according to the obtained solution result, so as to obtain a clustering result.

Embodiment 2

The difference between the high-order correlation preserved incomplete multi-view subspace clustering method provided in the present embodiment and that in Embodiment 1 is as follows:

To fully verify the effectiveness of the HCPIMSC method of the present application, the performance of the HCPIMSC method is first tested on three naturally incomplete multi-view databases (3sources, bbcsport, bbc) and six commonly used synthetic incomplete multi-view databases (MSRCV1, ORL, Yale, 100leaves, COIL20, handwritten). Meanwhile, a comparison is made with the following single-view clustering algorithm and six currently popular incomplete multi-view clustering algorithms.
(1) BSV: The method first fills each view by using a feature mean of each view, then uses spectral clustering for each view, and gives the best clustering result.
(2) MIC: The method uses a weighted non-negative matrix factorization based algorithm to learn a latent feature matrix from incomplete multi-view data for clustering.
(3) MKKM-IK: The method jointly carries out kernel k-means clustering and kernel matrix filling, and learns a common embedded representation for clustering.
(4) MKKM-IK-MKC: The method jointly carries out kernel k-means clustering and view interaction kernel matrix filling, and learns a common embedded representation for clustering.
(5) UEAF: The method uses embedding alignment and local structure preservation to jointly learn latent representation and incomplete view filling, and uses an adaptive weighted strategy to mine the difference of the views.
(6) FLSD: The method uses a graph-constrained matrix factorization model and semantic consistency constraints to learn view-specific latent representation and view-shared clustering representation, respectively.
(7) EE-R-IMVC: The method fills each incomplete view while learning consistency clustering representation from a multi-view low-dimensional feature matrix.

In experiments, the HCPIMSC method and other seven clustering methods were compared and tested on three naturally incomplete multi-view databases. The three naturally incomplete multi-view databases have the following specific information.
3sources: It contains a total of 416 news reports of six categories. Each set of news reports is obtained from three broadcasting stations, BBC, Reuters and Guardian. Data collected by each station is regarded as a view. Three views contain 352, 302, and 294 reported news, respectively.
bbcsport: It contains a total of 737 pieces of different sports news of five categories. Each view contains 519, 531, and 513 reported news, respectively.
bbc: It contains a total of 2225 pieces of different sports news of five categories. Each view contains 1828, 1832 and 1845 reported news, respectively.

In the experiments, the HCPIMSC method and other seven clustering methods were compared and tested on six synthetic incomplete multi-view databases. The six synthetic incomplete multi-view databases have the following specific information.

MSRCV1: It contains a total of 210 pictures for scene recognition of seven categories. Each picture is described using six different types of features, such as 256-dimensional LBP features, 100-dimensional HOG features, 512-dimensional GIST features, 48-dimensional Color Moment features, 1302-dimensional CENTRIST features, and 210-dimensional SIFT features.

ORL: It contains a total of 400 face pictures of 40 individuals under different lighting conditions, times, and facial details. In the experiment, three different types of features, such as 4096-dimensional intensity features, 3304-dimensional LBP features, and 6750-dimensional Gabor features, were used to describe each face picture.

Yale: It contains a total of 165 grey-scale face pictures of 15 individuals. In the experiment, 4096-dimensional intensity features, 3304-dimensional LBP features, and 4096-dimensional Gabor features were extracted, respectively.

100leaves: This dataset contains a total of 1600 plant pictures of 100 categories. In the experiment, three different types of features, including shape, texture, and edge from each picture were extracted according to the present embodiment.

COIL20: It contains a total of 1400 object pictures of 20 categories. For each picture, 1024-dimensional intensity features, 3304-dimensional LBP features, and 6750-dimensional Gabor features were extracted according to the present embodiment.

handwritten: It contains a total of 2000 handwritten digit pictures ranging from 0 to 9. For each picture, 76-dimensional FOU features, 216-dimensional FAC features, 64-dimensional KAR features, 240-dimensional Pix features, 47-dimensional ZER features, and 6-dimensional MOR features were extracted according to the present embodiment.

In the experiment, incomplete multi-view data with different paired ratios was generated from six standard multi-view datasets. First, $n_p$ samples were randomly selected and set to be observed in each view. Then, for remaining $n-n_p$ samples, a random matrix $M=[m_1, m_2, \ldots, m_{(n-n_p)}] \in \{0,1\}^{(n-n_p) \times V}$, $$0 < \sum_{v=1}^{V} m_{iv} < V$$

was generated, wherein $m_{iv}=1$ and $m_{jw}=0$ represented that the i-th sample in a v-th view was observed and a j-th sample in a w-th view was incomplete, respectively. For each standard dataset, incomplete data was generated with paired ratios being $[0.1,0.3,0.5,0.7,0.9]$, respectively, wherein a paired ratio σ was defined as $\sigma=n_p/n$. For each comparative algorithm, the experiment was repeated 20 times and an average clustering result was given. In addition, seven indexes including Accuracy (ACC), Normalized Mutual Information (NMI), Adjusted Random Index (ARI), F-score, Precision, Recall, and Purity were used to evaluate the clustering performance. Higher values of these seven indexes indicated better clustering performance.

Analysis of Results:

FIG. 3 shows seven clustering index results for different methods on the three naturally incomplete multi-view datasets. The following conclusions can be drawn from the present embodiment.

(1) The HCPIMSC algorithm significantly outperforms other comparative algorithms in the clustering result. For example, on the 3sources dataset, the HCPIMSC algorithm outperforms the second-best FLSD algorithm by 2.65, 4.99, and 2.65 percentage points in terms of ACC, NMI, and Purity indexes, respectively. Thus, it indicates that mining the high-order correlation of incomplete multi-view data can promote the clustering performance.

(2) The FLSD algorithm achieves better clustering effects on the 3source and bbcsport datasets compared with other comparative algorithms. This indicates that preserving local structures of the incomplete multi-view data can well promote clustering effects.

The HCPIMSC algorithm achieves better results than the FLSD algorithm, which indicates that a hypergraph using high-order sample correlation can recover underlying information of an incomplete view sample better than a similar graph based on paired sample correlation.

(3) BSV and MIC algorithms typically achieve relatively poor clustering results. This indicates that filling an incomplete view sample using a feature mean or a zero will destroy an original structure of the data, thereby reducing algorithm clustering performance.

(4) The HCPIMSC algorithm achieves better clustering results than the MKKM-IK, MKKM-IK-MKC, EE-R-IMVC and UEAF algorithms. This indicates that a high-order correlation in the incomplete multi-view data has a promoting role for a clustering task.

FIGS. 4A-F, 5A-F and 6A-F show clustering results of different algorithms under ACC, Fscore and Precision indexes on the synthetic incomplete multi-view datasets. The following conclusions can be drawn from the present embodiment.

(1) Under all paired ratio settings, the HCPIMSC algorithm can achieve better clustering effects than other comparative algorithms. One reason is that the HCPIMSC algorithm adaptively fills an incomplete view sample using a hypergraph-induced Laplacian matrix, rather than using a specific value. The second reason is that the HCPIMSC algorithm recovers subspace structures of the incomplete multi-view data using tensor factorization. The hypergraph-induced Laplacian constraint and tensor factorization can well mine high-order correlations of data, thereby promoting clustering effects.

(2) Under all paired ratio settings, the EE-R-IMVC, MKKM-IK-MKC and UEAF algorithms achieve good results on six datasets. This indicates that jointly carrying out filling and clustering tasks can promote the clustering performance. The HCPIMSC algorithm outperforms the three algorithms in the clustering result. This indicates that high-order correlations better recover class cluster structures than paired correlations.

(3) For the ORL dataset, the HCPIMSC algorithm achieves a better clustering result at a paired ratio of 0.5 than at a paired ratio of 0.9. A possible reason is that noise information in the data increases as the paired ratio increases. In this case, the HCPIMSC algorithm recovers a subspace structure with the noise, and thus, the clustering effect is reduced.

(4) For most data, all algorithms have better clustering results at a paired ratio of 0.9 than at a paired ratio of 0.1.

This indicates that the complementary information between views decreases as the sample paired ratio decreases.

In addition to comparing the clustering performance of the above methods, it is desirable to have more insight into the quality of the filled features. For this purpose, the filled features are pieced together to form a matrix, and this feature matrix is used for spectral clustering. Features of zero filling (ZF), mean filling (MF) and filling in the UEAF algorithm are compared. FIG. 7A-F show a clustering ACC index result for spectral clustering carried out on the filled features obtained under different sample paired ratios. From the results in FIG. 7A-F, it can be seen that the features filled by the HCPIMSC algorithm can achieve a better clustering result. This indicates the effectiveness of using high-order correlations to constrain a sample to be reconstructed near its neighbor sample.

In the HCPIMSC algorithm, hypergraph-induced Laplacian regularization (HR) and tensor factorization (TF) serve as two constraints to mine high-order correlations in incomplete multi-view data. To better explore their effectiveness, an ablation experiment is carried out and results are given in a table under seven clustering indexes on the three naturally incomplete multi-view datasets. From the results in FIG. 8, it can be seen that when the HCPIMSC algorithm lacks the hypergraph-induced Laplacian regularization (HR) constraint or the tensor factorization (TF) constraint, the clustering effect is rapidly reduced. This indicates that mining high-order correlations of data can promote incomplete multi-view clustering effects.

Parameter Sensitivity

The present application contains two hyperparameters, namely $\alpha$ and $\beta$. To investigate the sensitivity of the HCPIMSC algorithm to the two parameters, results of ACC, NMI and Purity of the HCPIMSC algorithm under different parameter combinations on the three naturally incomplete multi-view datasets are shown in FIGS. 9A-C, 10A-C, and 11A-C. From the results, it can be seen that the HCPIMSC algorithm has a small fluctuation along with a change effect of the parameter a, and is sensitive to the parameter $\beta$. In summary, the HCPIMSC algorithm can achieve satisfactory clustering results within a large parameter range.

Computational Complexity Analysis

In the optimization process of solving the objective function by an algorithm, the computational complexity mainly lies in update variables $\{Z^{(v)}\}_{v=1}^{V}$, $\{X_u^{(v)}\}_{v=1}^{V}$, U and V. For the update variable $\{Z^{(v)}\}_{v=1}^{V}$, in each iteration, a computational complexity of $O(Vn^3)$ needs to take for computing an inverse of a matrix. For the update variable $\{X_u^{(v)}\}_{v=1}^{V}$, in each iteration, a computational complexity of $O(V(n-n_c)^3)$ needs to take for computing an inverse of a matrix. For the update variables U and V, in each iteration, a computational complexity of $O(cnVlog(V)+cn^2V)$ needs to take for fast Fourier transform, inverse fast Fourier transform and matrix product. Therefore, the HCPIMSC algorithm has a computational complexity of $O(Vn^3+V(n-n_c)^3+cnVlog(V)+cn^2V)$ in each iteration.

Figure 12A:
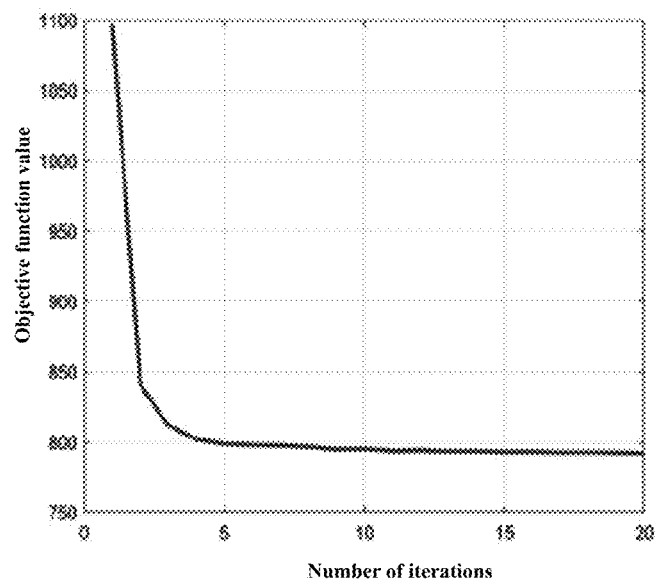
FIG. 12A-C are diagrams of convergence curves of the objective function of the HCPIMSC method on three naturally incomplete multi-view datasets according to Embodiment 2.
Figure 12B:
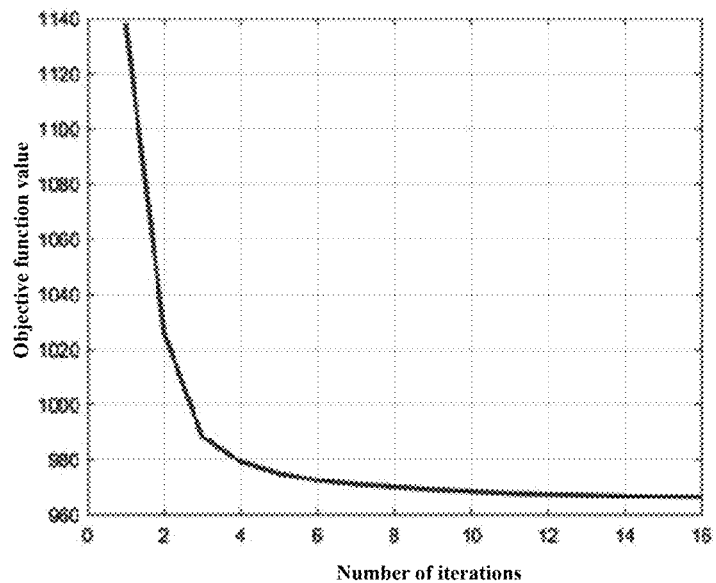
Figure 12C:
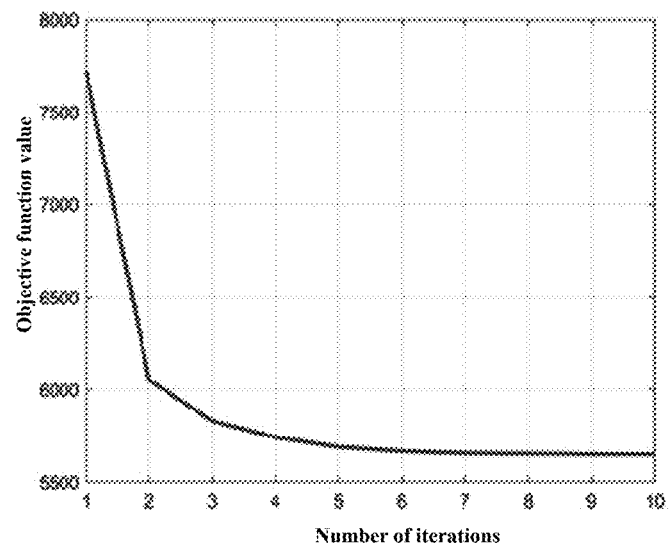

Empirical Convergence:

To verify the convergence of the HCPIMSC algorithm, the present embodiment records convergence curves of the objective function of the algorithm on the three naturally incomplete multi-view datasets. FIG. 12A-C show convergence curves of the objective function of the HCPIMSC algorithm on the three naturally incomplete multi-view datasets. As can be seen from the curves, the objective function value of the HCPIMSC algorithm monotonically decreases and converges within 20 iterations, thereby having strong convergence.

It should be noted that the above description is only preferred embodiments of the present application and the principles of the employed technologies. It should be understood by those skilled in the art that the present application is not limited to the particular embodiments described herein, and those skilled in the art can make various obvious changes, rearrangements and substitutions without departing from the protection scope of the present application. Therefore, although the above embodiments have provided a detailed description of the present application, the application is not limited to the above embodiments, and may further include other equivalent embodiments without departing from the spirit of the present application, and the scope of the present application is determined by the scope of the appended claims.

The invention claimed is:

1. A high-order correlation preserved incomplete multi-view subspace clustering method, comprising:
   S1, inputting an original data matrix, and converting the inputted original data into an observed part and an incomplete part;
   S2, obtaining a plurality of affinity matrices corresponding to incomplete multi-view data according to self-representation characteristics of the original data;
   S3, mining a high-order correlation between the plurality of affinity matrices by means of tensor factorization;
   S4, learning a unified affinity matrix from the plurality of affinity matrices to obtain a global affinity matrix;
   S5, constructing a hypergraph on the basis of the global affinity matrix, and constraining an incomplete part of the incomplete multi-view data by using a hypergraph-induced Laplacian matrix;
   S6, integrating the global affinity matrix, the tensor factorization and the hypergraph-induced Laplacian matrix constraint into a unified learning framework to obtain an objective function;
   S7, solving the obtained objective function by means of an alternating iterative optimization strategy to obtain a solution result; and
   S8, applying spectral clustering to the global affinity matrix according to the obtained solution result to obtain a clustering result,
   wherein converting the inputted original data into the observed part and the incomplete part in S1 is represented as:

$$X^{(v)} = X_o^{(v)} P_o^{(v)} + X_u^{(v)} P_u^{(v)}$$

wherein, $X^v \in R^{d_v \times n}$ represents a feature matrix of a v-th view; n represents the number of samples; $d_v$ represents the number of features in the v-th view; $X_o^{(v)} \in R^{d_v \times n_v}$ represents a feature matrix observed in the v-th view; $n_v$ represents the number of samples observed in the v-th view; $X_u^{(v)} \in R^{d_v \times (n-n_v)}$ represents incomplete samples in the v-th view; $P_o^{(v)} \in R^{n_v \times n}$ and $P_u^{(v)} \in R^{(n-n_v) \times n}$ represent that two transformation matrices map observed samples and incomplete samples intoa same matrix, and are represented as:

$$p_{o\,ij}^{(v)} = \begin{cases} 1, & \text{if } x_o^{(v)}{}_i \text{ corresponds to } x_j^{(v)} \\ 0, & \text{otherwise} \end{cases}$$

-continued $$p_{u_{ij}}^{(v)} = \begin{cases} 1, & \text{if } x_{u\,i}^{(v)} \text{ corresponds to } x_j^{(v)} \\ 0, & \text{otherwise} \end{cases}$$

wherein, $P_{o\,ij}^{(v)}$ represents an i-th row and a j-th column of a matrix $P_o^{(v)}$; $P_{u\,ij}^{(v)}$ represents an i-th row and a j-th column of a matrix $p_u^{(v)}$; $x_{o\,i}^{(v)}$ represents an i-th column of a matrix $x_o^{(v)}$; $x_j^{(v)}$ represents a j-th column of a matrix $x^{(v)}$; $x_{u\,i}^{(v)}$ represents an i-th column of a matrix $x_u^{(v)}$.

2. The high-order correlation preserved incomplete multi-view subspace clustering method according to claim 1, wherein obtaining the plurality of affinity matrices corresponding to the incomplete multi-view data in S2 is represented as:

$$\min_{X_u^{(v)}, Z^{(v)}} \sum_{v=1}^{V} \left\| X^{(v)} - X^{(v)} Z^{(v)} \right\|_F^2 + \beta \text{rank}_t(Z)$$

$$\text{s.t. } \text{diag}(Z^{(v)}) = 0, Z_{ij}^{(v)} \geq 0, Z^{(v)} = Z^{(v)T}, Z = \Phi(Z^{(1)}, Z^{(2)}, \ldots, Z^{(V)})$$

wherein, $\text{diag}(Z^{(v)}) = 0$, $Z_{ij}^{(v)} \geq 0$ and $Z^{(v)} = Z^{(v)T}$ are constrained such that a matrix $Z^{(v)} \in R^{n \times n}$ represents an affinity matrix of a v-th view; $\beta$ represents a penalty parameter; $Z \in R^{n \times n \times V}$ represents a tensor; $\Phi(\ )$ represents converting a matrix into a tensor; V represents the number of views; $Z_{ij}^{(v)}$ represents an i-th row and a j-th column of the matrix $Z^{(v)}$; $Z^{(v)T}$ represents transpose of the matrix $Z^{(v)}$; $\|\ \|_F^2$ represents a Frobenius norm.

3. The high-order correlation preserved incomplete multi-view subspace clustering method according to claim 2, wherein mining the high-order correlation between the plurality of affinity matrices by means of the tensor factorization in S3 is represented as:

$$\min_{X_u^{(v)}, Z^{(v)}, U, V} \sum_{v=1}^{V} \left\| X^{(v)} - X^{(v)} Z^{(v)} \right\|_F^2 + \beta \| Z - U * V \|_F^2$$

$$\text{s.t. } Z = \Phi(Z^{(1)}, Z^{(2)}, \ldots, Z^{(V)}), \text{diag}(Z^{(v)}) = 0, Z_{ij}^{(v)} \geq 0, Z^{(v)} = Z^{(v)T}$$

wherein, $U \in R^{n \times \hat{c} \times V}$ and $V \in R^{\hat{c} \times n \times V}$ represent two tensors with smaller sizes, satisfying $\text{rank}_t(U) = \text{rank}_t(V) = \hat{C}$, and $\text{rank}_t$ represents a tensor tubal rank; $\hat{c}$ represents a positive integer.

4. The high-order correlation preserved incomplete multi-view subspace clustering method according to claim 3, wherein learning the unified affinity matrix from the plurality of affinity matrices to obtain the global affinity matrix in S4 is represented as:

$$\min_A \omega_v \left\| Z^{(v)} - A \right\|_F^2 \text{ s.t. } \omega_v = \frac{1}{2 \left\| Z^{(v)} - A \right\|_F}$$

wherein, $\omega_v$ represents a weight of the v-th view; and A represents the global affinity matrix.

5. The high-order correlation preserved incomplete multi-view subspace clustering method according to claim 4, wherein the hypergraph-induced Laplacian matrix constraint in S5 is represented as:

$$\min_{X_u^{(v)}} Tr(X^{(v)} L_h X^{(v)T})$$

wherein, $L_h$ represents a hypergraph Laplacian matrix constructed on the basis of the global affinity matrix.

6. The high-order correlation preserved incomplete multi-view subspace clustering method according to claim 5, wherein obtaining the objective function in S6 is represented as:

$$\min_{X_u^{(v)}, A, Z^{(v)}, U, V} \sum_{v=1}^{V} (\left\| X^{(v)} - X^{(v)} Z^{(v)} \right\|_F^2 +$$

$$\omega_v \left\| Z^{(v)} - A \right\|_F^2 + \alpha Tr(X^{(v)} L_h X^{(v)T})) + \beta \| Z - U * V \|_F^2$$

$$\text{s.t. } Z = \Phi(Z^{(1)}, Z^{(2)}, \ldots, Z^{(V)}), \text{diag}(Z^{(v)}) = 0,$$

$$Z_{ij}^{(v)} \geq 0, Z^{(v)} = Z^{(v)T}, \omega_v = \frac{1}{2 \left\| Z^{(v)} - A \right\|_F}$$

wherein, $\alpha$ represents a penalty parameter.

7. The high-order correlation preserved incomplete multi-view subspace clustering method according to claim 6, wherein S7 specifically comprises:

S71, when variables A, $\{X_u^{(v)}\}_{v=1}^{V}$, U and V are fixed, the objective function being represented as:

$$\min_{Z^{(v)}} \left\| X^{(v)} - X^{(v)} Z^{(v)} \right\|_F^2 + \left\| Z^{(v)} - B^{(v)} \right\|_F^2$$

$$\text{s.t. } \text{diag}(Z^{(v)}) = 0, Z_{ij}^{(v)} \geq 0, Z^{(v)} = Z^{(v)T}$$

wherein, $B^{(v)}$ represents a v-th forward slice of a tensor B; the tensor B is obtained by $B = U * V$;

calculating a derivative of the objective function and setting the derivative to be 0, a solution of a variable $Z^{(v)}$ being:

$$Z^{(v)} = (I + Q^{(v)})^{-1} (Q^{(v)} + B^{(v)})$$

wherein, $Q^{(v)}$ represents an intermediate matrix, and is obtained by calculating $Q^{(v)} = X^{(v)T} X^{(v)}$;

optimizing the following formula, represented as:

$$\min_{Z^{(v)}} \left\| Z^{(v)} - \hat{Z}^{(v)} \right\|_F^2$$

$$\text{s.t. } Z_{ij}^{(v)} \geq 0, Z^{(v)} = Z^{(v)T}$$

wherein, $\hat{Z}^{(v)}$ represents an intermediate matrix, and is obtained by calculating $\hat{Z}^{(v)} = Z^{(v)} - \text{diag}(\text{diag}(Z^{(v)}))$; and obtaining an optimal solution of the objective function, represented as:

$$Z^{(v)} = \left[ (\hat{Z}^{(v)} + \hat{Z}^{(v)T})/2 \right]_+$$

wherein, $\hat{Z}^{(v)T}$ represents the transpose of the matrix $Z^{(v)}$;

S72, when variables $\{Z^{(v)}\}_{v=1}^{V}$, $\{X_u^{(v)}\}_{v=1}^{V}$, U and V are fixed, the objective function being represented as:

$$\min_A \sum_{v=1}^V \omega_v \|Z^{(v)} - A\|_F^2$$

calculating a derivative of the objective function and setting the derivative to be 0, a solution of the variable A being:

$$A = \frac{\sum_{v=1}^V \omega_v Z^{(v)}}{\sum_{v=1}^V \omega_v}$$

S73, when variables $\{Z^{(v)}\}_{v=1}^V$, A, U and V are fixed, substituting the variables into a formula $X^{(v)} = X_o^{(v)} P_o^{(v)} + X_u^{(v)} P_u^{(v)}$, the objective function being represented as:

$$\min_{X_u^{(v)}} \alpha Tr\left((X_o^{(v)} P_o^{(v)} + X_u^{(v)} P_u^{(v)}) L_h (X_o^{(v)} P_o^{(v)} + X_u^{(v)} P_u^{(v)})^T\right) + \|(X_o^{(v)} P_o^{(v)} + X_u^{(v)} P_u^{(v)})(Z^{(v)} - I_n)\|_F^2$$

calculating a derivative of the objective function and setting the derivative to be 0, a solution of a variable $X_u^{(v)}$ being:

$$X_u^{(v)} = \left(X_o^{(v)} P_o^{(v)} M^{(v)} P_u^{(v)T}\right)\left(P_u^{(v)} M^{(v)} P_u^{(v)T}\right)^{-1}$$

wherein, $M^{(v)}$ represents an intermediate matrix, and is obtained by calculating $M^{(v)} = (Z^{(v)} - I)(Z^{(v)T} - I) + \alpha L_h$; I represents an identity matrix;

S74, when variables $\{Z^{(v)}\}_{v=1}^V$, A, $\{X_u^{(v)}\}_{v=1}^V$ and V are fixed, the objective function being represented as:

$$\min_U \|Z - U * V\|_F^2$$

making $\overline{Z}$, $\overline{U}$ and $\overline{V}$ represent results of a fast Fourier transform of the tensors Z, U and V along a third dimension, respectively, and substituting the results into a formula $$U * V = \sum_{v=1}^V \overline{U}^{(v)} \overline{V}^{(v)},$$

the objective function being represented as:

$$\min_{\overline{U}^{(v)}} \|\overline{Z}^{(v)} - \overline{U}^{(v)} \overline{V}^{(v)}\|_F^2$$

calculating a derivative of the objective function and setting the derivative to be 0, a solution of a variable $\overline{U}^{(v)}$ being:

$$\overline{U}^{(v)} = \overline{Z}^{(v)} \overline{V}^{(v)*} \left(\overline{V}^{(v)} \overline{V}^{(v)*}\right)^{-1}$$

wherein, $\overline{U}^{(v)}$ represents a v-th slice of the tensor $\overline{U}$; $\overline{Z}^{(v)}$ represents a v-th slice of the tensor $\overline{Z}$; $\overline{V}^{(v)}$ represents a v-th slice of the tensor $\overline{V}$; $\overline{V}^{(v)*}$ represents conjugate transpose of a matrix $\overline{V}^{(v)}$; and S75, when variables $\{Z^{(v)}\}_{v=1}^V$, A, $\{X_u^{(v)}\}_{v=1}^V$ and U are fixed, the objective function being represented as:

$$\min_{\overline{V}^{(v)}} \|\overline{Z}^{(v)} - \overline{U}^{(v)} \overline{V}^{(v)}\|_F^2$$

calculating a derivative of the objective function and setting the derivative to be 0, a solution of a variable $\overline{V}^{(v)}$ being:

$$\overline{V}^{(v)} = \left(\overline{U}^{(v)*} \overline{U}^{(v)}\right)^{-1} \overline{U}^{(v)*} \overline{Z}^{(v)}.$$

8. The high-order correlation preserved incomplete multi-view subspace clustering method according to claim 7, wherein obtaining the optimal solution of the objective function in S71 specifically comprises: acquiring an optimal solution of the objective function in an unconstrained state, and mapping the acquired optimal solution in the unconstrained state into a space spanned by constrained items to obtain a final solution of the objective function.

* * * * *